United States Patent
Nomura et al.

(10) Patent No.: US 6,839,187 B2
(45) Date of Patent: Jan. 4, 2005

(54) LENS DISTANCE-VARYING MECHANISM, AND STEP-ZOOM LENS INCORPORATING THE SAME

(75) Inventors: Hiroshi Nomura, Saitama (JP); Hitoshi Tanaka, Saitama (JP); Takamitsu Sasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/731,475

(22) Filed: Dec. 10, 2003

(65) Prior Publication Data

US 2004/0114253 A1 Jun. 17, 2004

(30) Foreign Application Priority Data

| Dec. 11, 2002 | (JP) | ........................................ 2002-359804 |
| Dec. 11, 2002 | (JP) | ........................................ 2002-359805 |
| Dec. 11, 2002 | (JP) | ........................................ 2002-359806 |

(51) Int. Cl.$^7$ ............................................. G02B 15/14
(52) U.S. Cl. ...................... 359/700; 359/701; 359/695
(58) Field of Search ................................. 359/699–701, 359/703, 704, 823, 694, 695; 396/72, 79

(56) References Cited

U.S. PATENT DOCUMENTS

| 4,974,949 | A | | 12/1990 | Tanaka ........................ 359/704 |
| 5,528,430 | A | * | 6/1996 | Hamasaki ..................... 359/701 |
| 5,790,901 | A | | 8/1998 | Nakayama et al. ............ 396/82 |
| 6,369,955 | B1 | | 4/2002 | Enomoto et al. ............ 359/685 |
| 6,437,922 | B2 | | 8/2002 | Enomoto et al. ............ 359/685 |
| 6,456,445 | B2 | * | 9/2002 | Nomura et al. ............. 359/699 |
| 6,493,512 | B2 | | 12/2002 | Sato ............................ 396/83 |
| 6,512,638 | B2 | | 1/2003 | Sato et al. .................... 359/701 |
| 6,519,096 | B2 | * | 2/2003 | Nomura et al. ............. 359/700 |
| 6,631,035 | B2 | * | 10/2003 | Iikawa et al. ................ 359/699 |

FOREIGN PATENT DOCUMENTS

| JP | 6-100708 | 12/1994 |
| JP | 8-94907 | 4/1996 |
| JP | 2000-199843 | 7/2000 |
| JP | 2000-275518 | 10/2000 |

* cited by examiner

*Primary Examiner*—Georgia Epps
*Assistant Examiner*—M. Hasan
(74) *Attorney, Agent, or Firm*—Greenblum & Bernstein, P.L.C.

(57) ABSTRACT

A lens distance-varying mechanism for varying a distance between first and second lens groups includes a first lens frame; a second lens frame rotatable relative to the first lens frame; a relative-moving mechanism for moving the first and second lens frames to change a relative position therebetween on an optical axis when the second lens frame is positioned at each of forward and reverse rotation extremities thereof relative to the first lens frame; a differential linking ring which rotates together with the second lens frame; a differential ring which is rotated relative to the differential linking ring by a first angle of rotation greater than a second angle of rotation of the second lens frame relative to the first lens frame; and a biasing member, positioned between the differential ring and the differential linking ring, for absorbing a difference between the first and second angles of rotation.

24 Claims, 17 Drawing Sheets

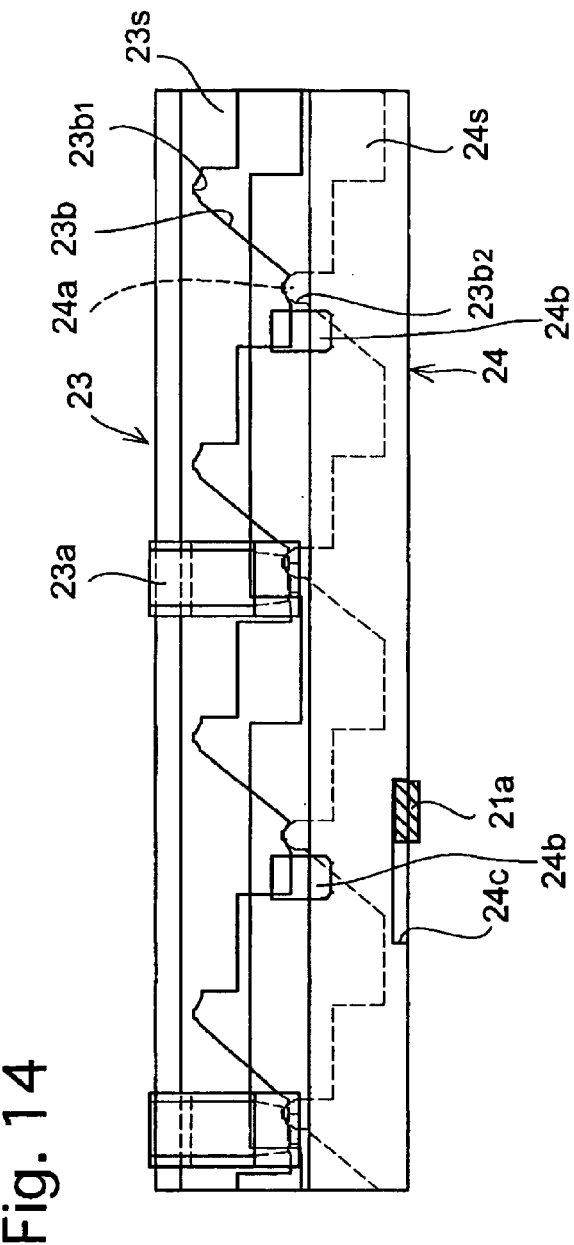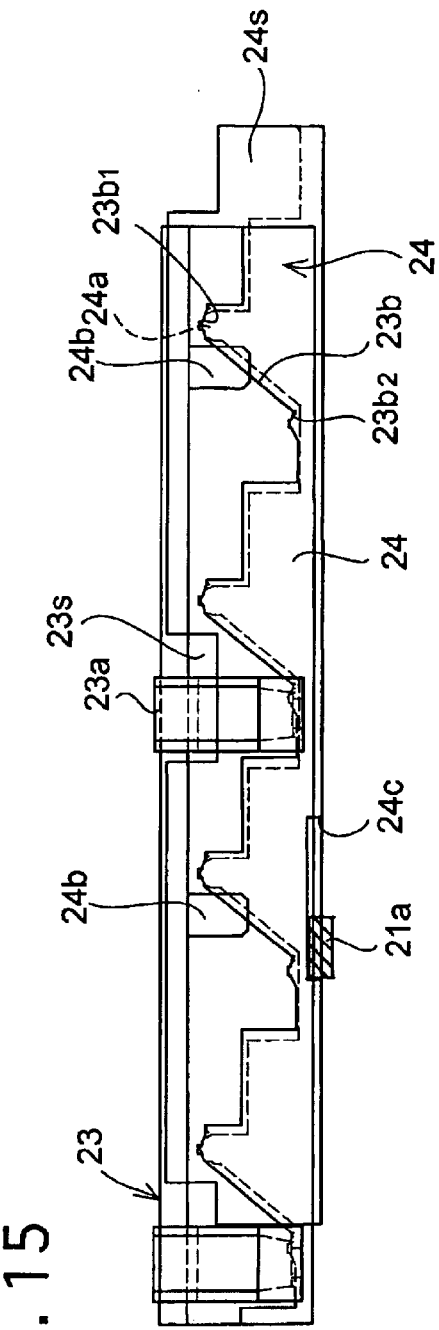
Fig. 14
Fig. 15

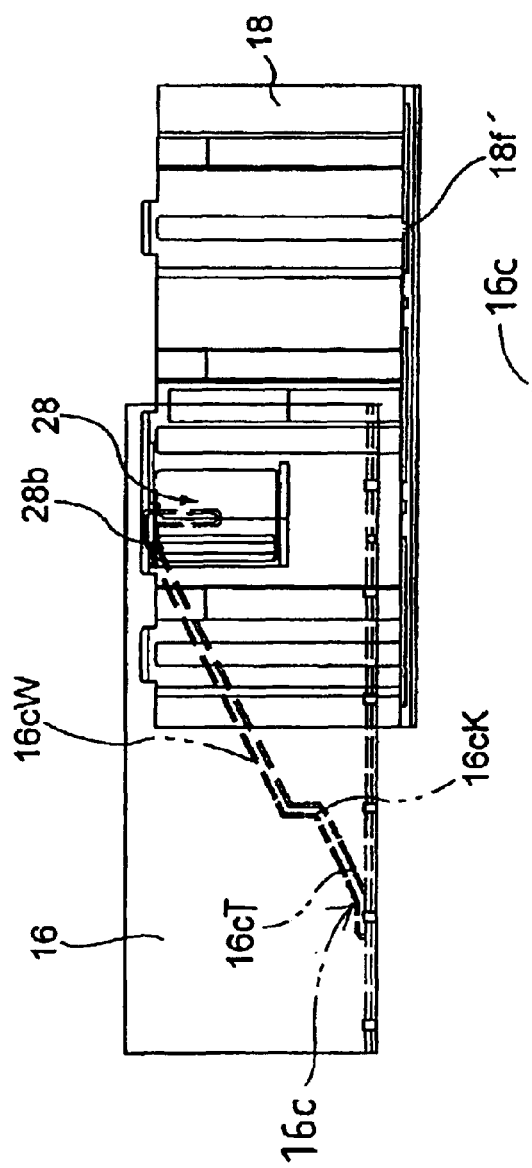
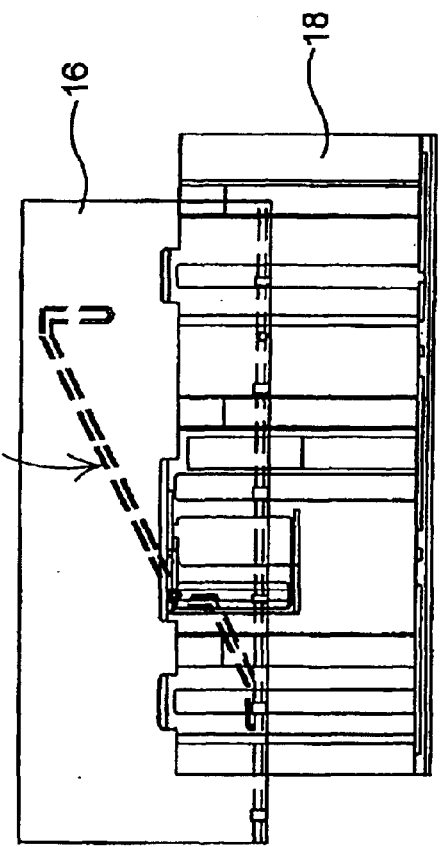

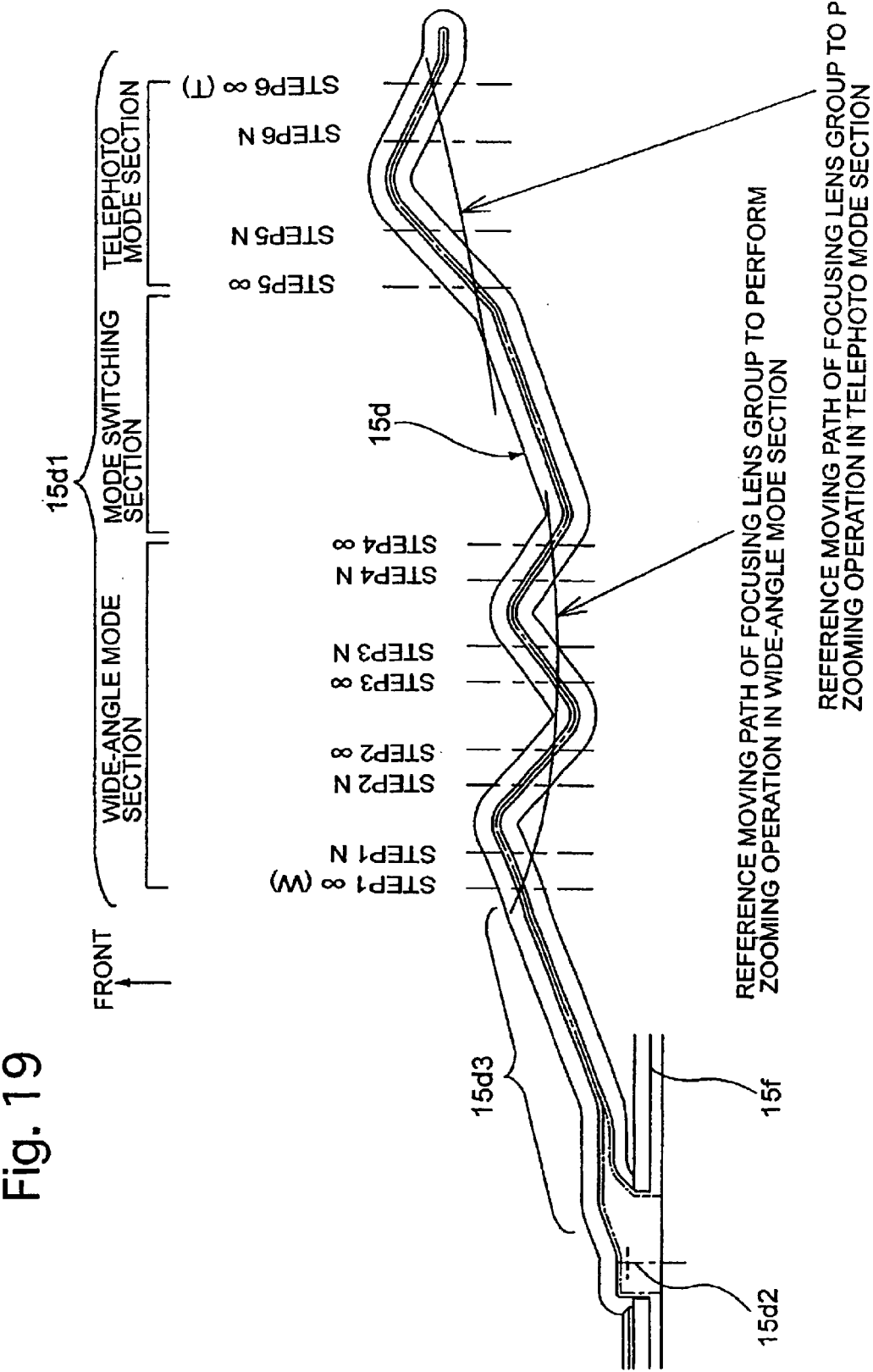

LENS DISTANCE-VARYING MECHANISM, AND STEP-ZOOM LENS INCORPORATING THE SAME

BACKGROUND OF THE INVENTION

1. Field of the Invention

The present invention relates to a lens distance-varying mechanism for varying the distance between two lens groups, and a step-zoom lens which incorporates such a mechanism.

2. Description of the Related Art

The assignee of the present invention has proposed a step-zoom lens system having a distance-varying lens group in which the distance between two lens groups varies at an intermediate focal length. Specifically, this zoom lens system includes a plurality of movable lens groups which are moved to vary the focal length of the zoom lens system, and at least one lens group of the plurality of movable lens groups includes two sub-lens groups serving as a switching lens group. One of the two sub-lens groups is moveable, along the optical axis of the zoom lens system, to be selectively positioned at one of the movement extremities of the moveable sub-lens group with respect to the other sub-lens group. In a short-focal-length side zooming range covering the short focal length extremity over an intermediate focal length, the moveable sub-lens group is arranged to position at one of the movement extremities thereof. In a long-focal-length side zooming range covering the long focal length extremity over the intermediate focal length, the moveable sub-lens group is arranged to position at the other of the movement extremities thereof. The moving path of the switching lens group having the two sub-lens groups, and the moving paths of the other lens groups of the plurality of movable lens groups are discontinued at the intermediate focal length. The zoom lens system is arranged to form an image on a predetermined image plane in accordance with a position of the moveable sub-lens group. This zoom lens system is disclosed in U.S. Pat. No. 6,369,955 (Japanese Unexamined Patent Publication No. 2000-275518).

To apply this step-zoom lens system, the distance between two sub-lens groups of a lens group must be varied at an intermediate focal length.

SUMMARY OF THE INVENTION

The present invention provides a simple and reliable mechanism for varying the distance between two lens groups, especially suitable for a step-zoom lens system such as described above.

The present invention provides a step-zoom lens which incorporates such a lens distance varying mechanism.

According to an aspect of the present invention, a lens distance-varying mechanism for varying a distance between a first lens group and a second lens group is provided, the lens distance-varying mechanism including a first lens frame which holds the first lens group; a second lens frame which holds the second lens group, and is rotatable relative to the first lens frame within a predetermined angle of rotation; a relative-moving mechanism for moving the first lens frame and the second lens frame to change a relative position therebetween on an optical axis when the second lens frame is positioned at each of forward and reverse rotation extremities of the second lens frame relative to the first lens frame; a differential linking ring which rotates together with the second lens frame; a differential ring which is rotated relative to the differential linking ring by a first angle of rotation greater than a second angle of rotation of the second lens frame relative to the first lens frame; and a biasing member, positioned between the differential ring and the differential linking ring, for absorbing a difference between the first angle of rotation and the second angle of rotation.

The biasing member can be a torsion coil spring.

It is desirable for the torsion coil spring to include a coil portion and a pair of engaging radial projections which project radially outwards from opposite ends of the coil portion, respectively. The coil portion is engaged with the differential linking ring by friction. The pair of engaging radial projections project radially outwards from a pair of radial through holes which are formed on the differential linking ring to hold a rotation transfer projection formed on the differential ring.

It is desirable for the coil portion to be fitted in the differential linking ring to be engaged with an inner peripheral surface thereof by friction.

It is desirable for the pair of engaging radial projections of the torsion coil spring to be in pressing contact with opposite surfaces of the rotation transfer projection in a circumferential direction of the differential ring in opposite directions towards each other.

It is desirable for the relative-moving mechanism to include at least one inclined cam edge formed on a peripheral surface of one of the first lens frame and the second lens frame; and at least one cam follower formed on a peripheral surface of the other of the first lens frame and the second lens frame to be engaged with the inclined cam edge.

It is desirable for the first lens group and the second lens group serve as movable lens groups of a zoom lens system. The relative-moving mechanism varies a distance between the first lens group and the second lens group between a first distance in a wide-angle range which ranges from a short focal length extremity to an intermediate focal length and a second distance in a telephoto range which ranges from the intermediate focal length to a long focal length extremity. The first lens group and the second lens group move along the optical axis without changing the distance therebetween in a predetermined moving manner to perform a zooming operation in each of the wide-angle range and the telephoto range.

It is desirable for the first lens frame and the second lens frame, together with the differential linking ring, the differential ring and the biasing member, to be supported by a support member which is linearly guided along the optical axis without rotating.

It is desirable for the first lens group and the second lens group to serve as movable lens groups of a zoom lens system. The zoom lens system can include at least four movable lens groups including the first lens group and the second lens group, the first lens group and the second lens group being positioned between a frontmost lens group and a rearmost lens group of the four movable lens groups.

In another embodiment, a lens distance-varying mechanism for varying a distance between a first lens group and a second lens group is provided, the lens distance-varying mechanism including a first lens frame which holds the first lens group, is linearly movable along an optical axis, and includes a first cylindrical portion; a second lens frame which holds the second lens group, is allowed to rotate relative to the first lens frame within a predetermined angle of rotation while being prevented from moving along the optical axis relative to the first lens frame, and includes a second cylindrical portion, one of the first cylindrical portion and the second cylindrical portion being fitted on the other; a plurality of inclined cam edges formed on one of the first cylindrical portion and the second cylindrical portion at predetermined intervals in a circumferential direction, each inclined cam edge of the plurality of inclined cam edge being inclined to both the circumferential direction and the optical axis direction; a plurality of cam followers formed on the other of the first cylindrical portion and the second cylindrical portion to be engaged with the plurality of inclined cam edges, respectively; a biasing device for biasing the first lens frame in a direction to bring the plurality of cam followers into contact with the plurality of inclined cam edges, respectively, and a drive system for driving the second lens frame to rotate forward and reverse.

It is desirable for a first recess and a second recess to be formed on the one of the first cylindrical portion and the second cylindrical portion at opposite ends of each cam edge of the plurality of cam edges to hold an associated cam follower of the plurality of cam followers with stability.

It is desirable for the first lens group and the second lens group to serve as movable lens groups of a zoom lens system. The relative-moving mechanism varies a distance between the first lens group and the second lens group between a first distance in a wide-angle range which ranges from a short focal length extremity to an intermediate focal length and a second distance in a telephoto range which ranges from the intermediate focal length to a long focal length extremity. The first lens group and the second lens group move along the optical axis without changing the distance therebetween in a predetermined moving manner to perform a zooming operation in each of the wide-angle range and the telephoto range.

It is desirable for the first lens frame and the second lens frame to be supported by a support member which is linearly guided along the optical axis without rotating, and for the position of the support member in the optical axis direction to be controlled by a cam ring which is driven to rotate. The drive system can include a linear guide ring which moves together with the cam ring along the optical axis while allowing the cam ring to rotate with respect to the linear guide ring; a switching member which is positioned on a peripheral surface of the linear guide ring to be supported thereby to be relatively movable in a circumferential direction with respect to the linear guide ring within a predetermined angle of rotation about the optical axis; a switching member moving mechanism for moving the switching member forward and reverse in the circumferential direction of the linear guide ring at an intermediate focal length in association with rotation of the cam ring; and a movement transfer mechanism for transferring forward and reverse movements of the switching member in the circumferential direction of the linear guide ring to the second lens frame to rotate the second lens frame forward and reverse, respectively.

It is desirable for the forward and reverse movements of the switching member to cause the first lens frame and the second lens frame to vary a distance therebetween between a narrow distance and a wide distance.

It is desirable for the first lens group and the second lens group to serve as movable lens groups of a zoom lens system.

In another embodiment, a zoom lens is provided, having a zoom lens system including two movable lens groups which are moved relative to each other, wherein a distance between the two movable lens groups varies between a first distance in a wide-angle range which ranges from a short focal length extremity to an intermediate focal length and a second distance in a telephoto range which ranges from the intermediate focal length to a long focal length extremity. The zoom lens includes a lens group support unit which supports the two movable lens groups, and is linearly guided along an optical axis; and a cam ring driven to rotate for controlling the position of the lens group support unit in the optical axis direction; a linear guide ring which moves together with the cam ring along the optical axis while allowing the cam ring to rotate with respect to the linear guide ring; a switching member which is positioned on a peripheral surface of the linear guide ring to be supported thereby to be relatively movable in a circumferential direction with respect to the linear guide ring within a predetermined angle of rotation about the optical axis; a switching member moving mechanism for moving the switching member forward and reverse in the circumferential direction of the linear guide ring at an intermediate focal length in association with rotation of the cam ring; and a lens distance varying mechanism for varying the distance between the two movable lens groups between the first distance and the second distance in association with forward and reverse movements of the switching member at forward and reverse moving limits thereof, respectively.

It is desirable for the switching member moving mechanism to include a switching ring which rotates together with the cam ring; a switching groove formed on an inner peripheral surface of the switching ring; and a follower projection which projects from the switching member to be engaged in the switching groove.

It is desirable for the lens distance varying mechanism to include a differential ring which rotates together with the switching member; a rotating lens frame which supports one of the two movable lens groups, and rotates without moving along the optical axis by a rotation of the differential ring; and a linear-moving lens frame which supports the other of the two movable lens groups, and linearly moves along the optical axis by a rotation of the rotating lens frame.

It is desirable for the switching member to include a straight groove which is formed on an inner peripheral surface of the switching member to extend parallel to the optical axis. The differential ring includes a projection which projects radially outwards to be engaged in the straight groove.

The linear guide ring can include a guide slot in which the switching member is positioned so that an outer peripheral surface of the switching member is substantially flush with an outer peripheral surface of the linear guide ring.

The zoom lens can include a shutter unit which is fixed to the lens group support unit.

It is desirable for the first distance to be wider than the second distance.

The zoom lens system can include at least four movable lens groups, the two movable lens groups being positioned between a frontmost lens group and a rearmost lens group of the four movable lens groups.

It is desirable for the zoom lens to be a telescoping type zoom lens having a plurality of telescoping barrels.

The present disclosure relates to subject matter contained in Japanese Patent Applications Nos. 2002-359804, 2002-359805 and 2002-359806 (all filed on Dec. 11, 2002) which are expressly incorporated herein by reference in their entireties.

BRIEF DESCRIPTION OF THE DRAWINGS

The invention will be discussed below in detail with reference to the accompanying drawings, in which:

FIG. 14 is a developed view of the second/third lens group support unit in a wide-angle mode;

FIG. 15 is a developed view of the second/third lens group support unit in a telephoto mode;

FIGS. 18A through 18D are developed views of the switching ring shown in FIG. 7, the first linear guide ring shown in FIG. 9 and a switching leaf of the second/third lens group support unit shown in FIG. 11 in different states, showing transitions in relative position among these three elements of the zoom lens barrel from a state at wide-angle extremity shown in FIG. 18A to a state at telephoto extremity shown in FIG. 18D; and FIG. 19 is a developed view of a cam groove provided on a cam ring of the zoom lens barrel.

DESCRIPTION OF THE PREFERRED EMBODIMENT

Figure 1:
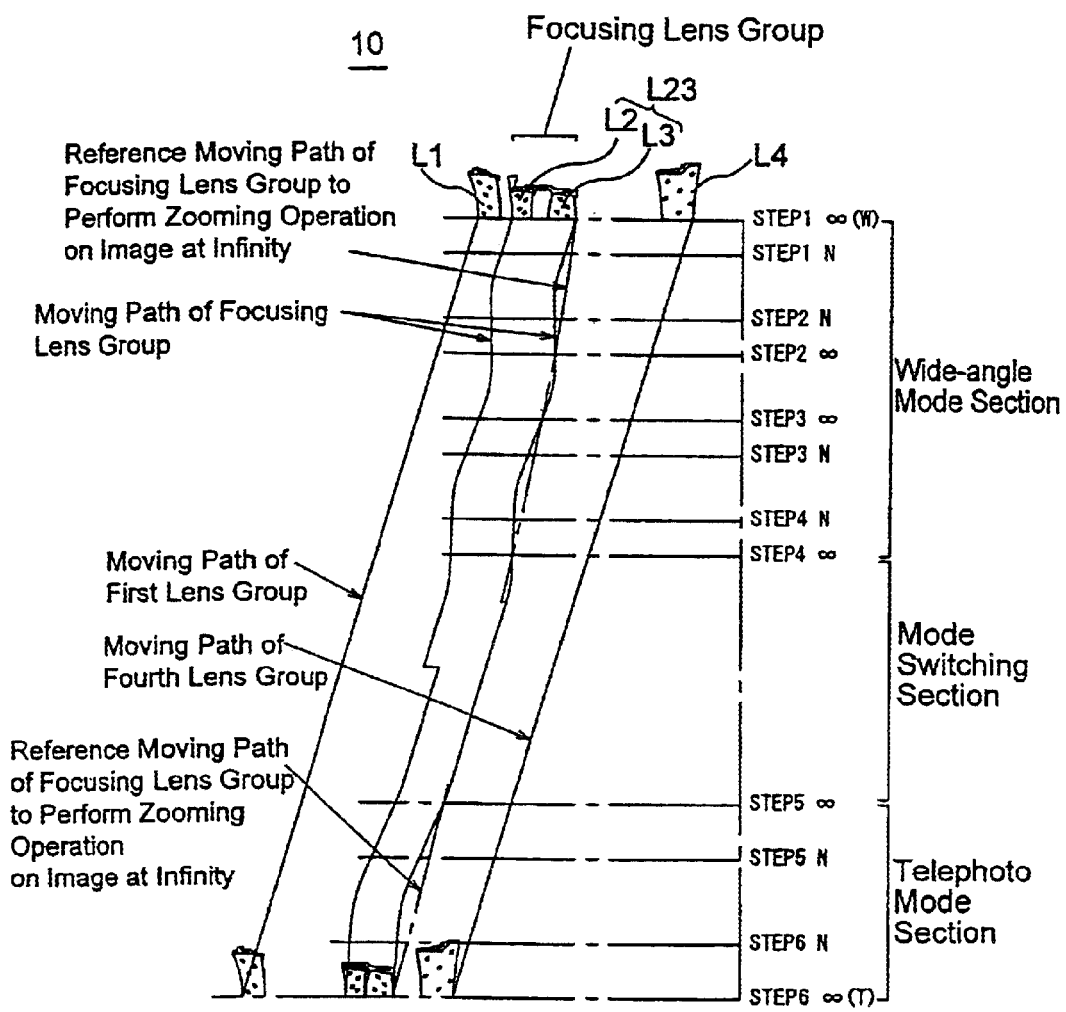
FIG. 1 is a diagram showing lens-group-moving paths of a step-zoom lens system (which includes a switching lens group) of a zoom lens barrel according to the present invention.

FIG. 1 shows a zoom lens system provided in an embodiment of a zoom lens barrel according to the present invention. The zoom lens system of the zoom lens barrel 10 includes a positive first lens group L1, and a negative second lens group L2, a positive third lens group L3 and a negative fourth lens group L4, in that order from the object side (left side as viewed in FIG. 3). The second lens group L2 and the third lens group L3 serve as a distance-varying lens group (L23) which changes the distance therebetween at an intermediate range of focal length (mode switching section) from a wide distance in a wide-angle range (wide-angle mode section) to a narrow distance in a telephoto range (telephoto mode section) and vice versa. The second lens group L2 and the third lens group L3 move together without changing the distance therebetween in each of the wide-angle range and the telephoto range. The first lens group L1 and the fourth lens group L4 always move together without changing the distance therebetween. Over the entire zooming range from the short focal length extremity (wide-angle extremity (W)) to the long focal length extremity (telephoto extremity (T)), each of the first lens group L1, the distance-varying lens group L23 and the fourth lens group L4 moves monotonously in a forward direction from the image side (right side as viewed in FIG. 1) to the object side (left side as viewed in FIG. 1) when a zooming operation is carried out from wide-angle extremity to telephoto extremity, or in a retracting direction from the object side to the image side (from left to right as viewed in FIG. 1) when a zooming operation is carried out from telephoto extremity to wide-angle extremity. The present embodiment of the zoom lens barrel 10 is a step-zoom lens barrel which changes the focal length stepwise (specifically, six different focal lengths) when performing a zooming operation, and the distance-varying lens group L23 serves as a focusing lens group in the step-zoom lens barrel. Accordingly, solid lines shown in FIG. 1 which are drawn in association with the first lens group L1, the distance-varying lens group L23 and the fourth lens group L4, represent associated cam diagrams (which include cam diagrams for a focusing operation). A reference moving path of the distance-varying lens group L23 to perform a zooming operation for an image at infinity is represented by one-dot chain lines shown in FIG. 1 which are drawn in association with the distance-varying lens group L23.

This type of zoom lens system having a distance-varying lens group in which the distance between two lens elements varies at an intermediate focal length has been proposed in U.S. Pat. No. 6,369,955 (Japanese Unexamined Patent Publication No. 2000-275518), the assignee of which is the same as that of the present invention. This zoom lens system includes a plurality of movable lens groups which are moved to vary the focal length of the zoom lens system, and at least one lens group of the plurality of movable lens groups includes two sub-lens groups serving as a switching lens group. One of the two sub-lens groups is moveable, along the optical axis of the zoom lens system, to be selectively positioned at one of the movement extremities of the moveable sub-lens group with respect to the other sub-lens group. In a short-focal-length side zooming range covering the short focal length extremity over an intermediate focal length, the moveable sub-lens group is arranged to position at one of the movement extremities thereof. In a long-focal-length side zooming range covering the long focal length extremity over the intermediate focal length, the moveable sub-lens group is arranged to position at the other of the movement extremities thereof. The moving path of the switching lens group having the two sub-lens groups, and the moving paths of the other lens groups of the plurality of movable lens groups are discontinued at the intermediate focal length. The zoom lens system is arranged to form an image on a predetermined image plane in accordance with a position of the moveable sub-lens group. Although the first through fourth lens groups L1 through L4 are shown as a single lens elements in the lens-group-moving paths shown in FIG. 1, each of the first through fourth lens groups L1 through L4 generally consists of more than one lens element.

Figure 2:
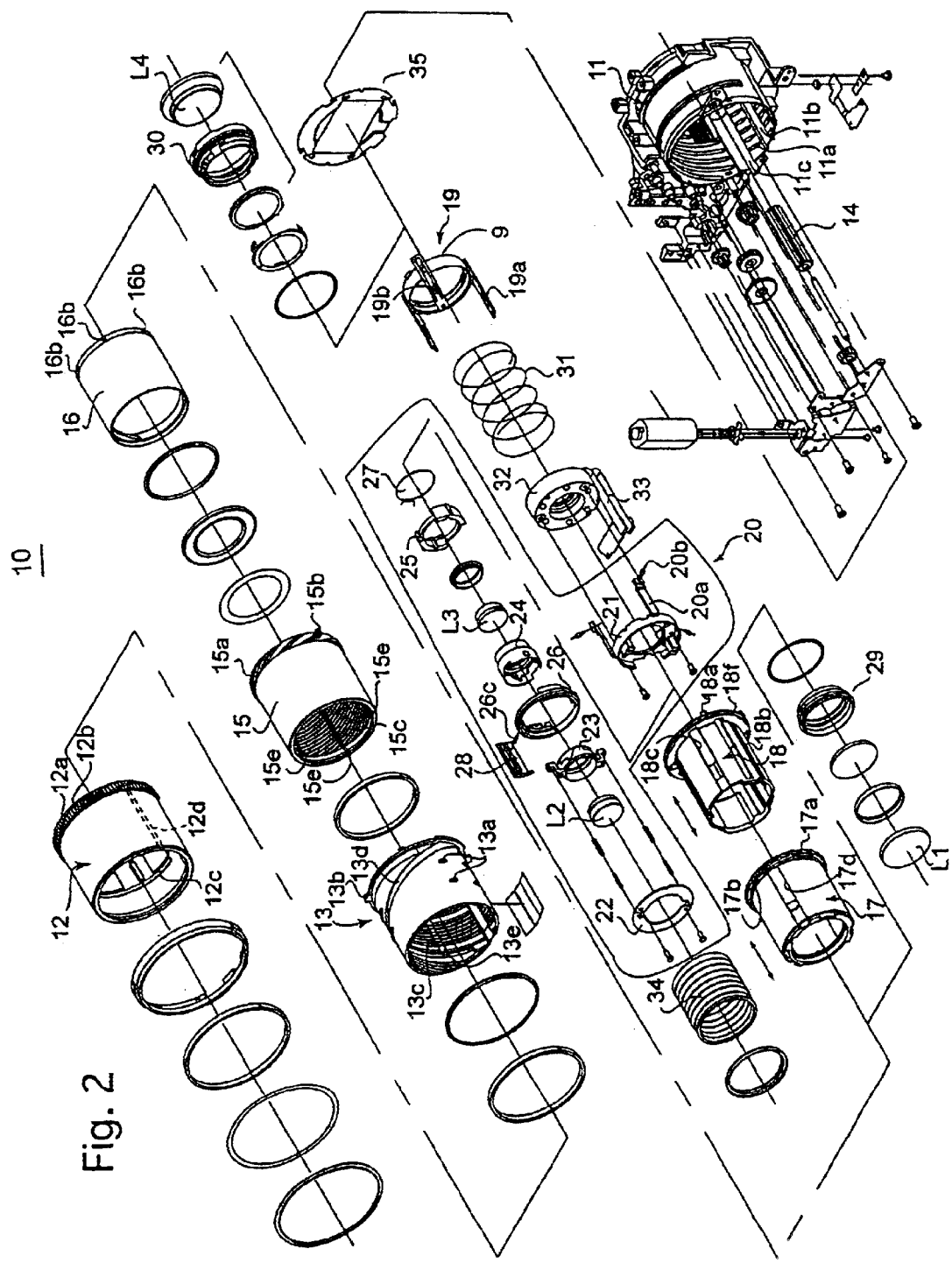
FIG. 2 is an exploded perspective view of an embodiment of the zoom lens barrel according to the present invention.

FIGS. 2 through 19 show the overall structure of the present embodiment of the zoom lens barrel 10. The zoom lens barrel 10 is provided with a stationary barrel 11 which is fixed to a camera body. As shown in FIGS. 2 through 5, the stationary barrel 11 is provided on an inner peripheral surface thereof with a female helicoid 11a and a plurality of linear guide grooves 11b (only one of them appears in FIG. 2) which extend parallel to an optical axis O. As can be understood from FIGS. 3 through 5, the zoom lens barrel 10 is a telescoping type zoom lens which is provided with three external telescoping barrels: a first external barrel (helicoid ring) 12, a second external barrel (cam ring) 15 and a third external barrel (switching ring) 16, which are concentrically arranged about the optical axis O. The female helicoid 11a of the stationary barrel 11 is engaged with a male helicoid 12a which is formed on an outer peripheral surface of the helicoid ring 12 in the vicinity of the rear end thereof. The zoom lens barrel 10 is provided with a second linear guide ring 13 which is fitted in the helicoid ring 12 to be movable together with the helicoid ring 12 along the optical axis O and to be freely rotatable relative to the helicoid ring 12. Namely, the helicoid ring 12 is provided on an inner peripheral surface thereof with two circumferential grooves 12c which extend parallel to each other in a circumferential direction of the helicoid ring 12, while the second linear guide ring 13 is provided on an outer peripheral surface thereof with a pair of guide projections 13a which are respectively engaged in the two circumferential grooves 12c of the helicoid ring 12 to be freely movable therein. The pair of guide projections 13a, which are aligned in a direction parallel to the optical axis O as shown in FIG. 2, remain respectively engaged with the two circumferential grooves 12c when the zoom lens barrel 10 is in use. The second linear guide ring 13 is provided at the rear end thereof with a plurality of radial projections 13b (only one of them appear in FIG. 2) which extend radially outwards to be engaged in the plurality of linear guide grooves 11b of the stationary barrel 11, respectively.

The helicoid ring 12 is provided on the thread of the male helicoid 12a with a spur gear 12b which is engaged with a drive pinion 14. The drive pinion 14 is provided in a recessed portion 11c (see FIG. 2) formed on an inner peripheral surface of the stationary barrel 11. The drive pinion 14 is supported by the stationary barrel 11 to be freely rotatable in the recessed portion 11c on an axis of the drive pinion 14. Accordingly, forward and reverse rotations of the drive pinion 14 cause the helicoid ring 12 to move forward rearward along the optical axis O while rotating about the optical axis O, thus causing the second linear guide ring 13 to move linearly along the optical axis O along with the helicoid ring 12.

Figure 6:
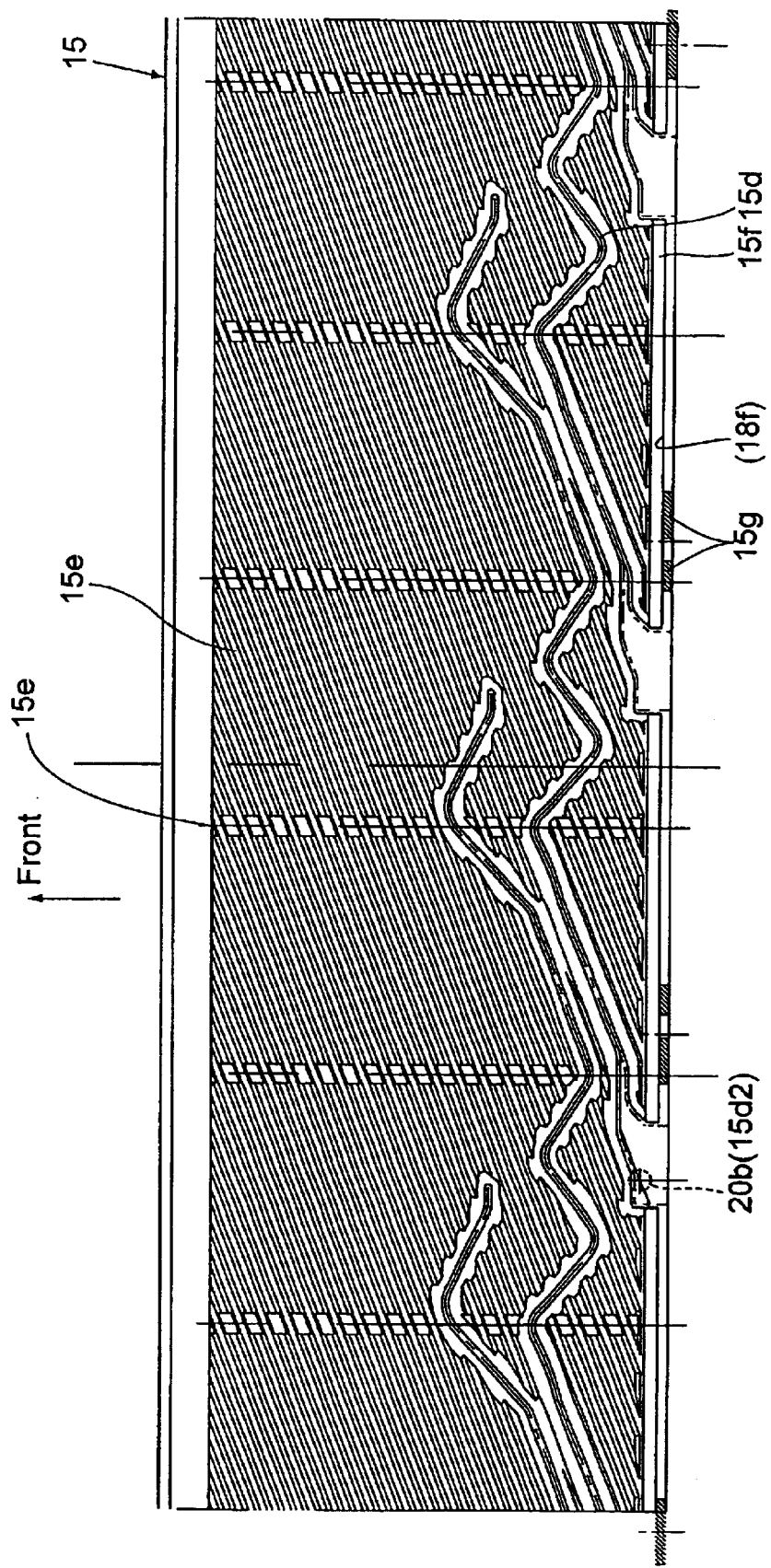
FIG. 6 is a developed view of an inner peripheral surface of a cam ring of the zoom lens barrel shown in FIG. 2.

The cam ring 15 is fitted inside the second linear guide ring 13. FIG. 6 is a developed view of an inner peripheral surface of the cam ring 15. The cam ring 15 is provided, on an outer peripheral surface thereof in the vicinity of the rear end of the cam ring 15, with a guide pin 15b which extends radially outwards from a portion of the male helicoid 15a.

The male helicoid 15a is engaged with a female helicoid 13c formed on an inner peripheral surface of the second linear guide ring 13, while the guide pin 15b is engaged in a clearance slot 13d which is formed on the second linear guide ring 13 to extend in a direction both in a circumferential direction of the second linear guide ring 13 and in the optical axis direction (the direction of the optical axis O). The guide pin 15b passes through the clearance slot 13d to be engaged in a linear guide groove 12d, which is formed on an inner peripheral surface of the helicoid ring 12d (shown by broken lines in FIG. 2) and extends parallel to the optical axis O. Therefore, a rotation of the helicoid ring 12 causes the cam ring 15 to move along the optical axis O while rotating about the optical axis O due to the engagement of the female helicoid 13c with the male helicoid 15a. The cam ring 15 is provided on an inner peripheral surface thereof with a female helicoid 15c (see FIGS. 2 and 6) and a set of three bottomed cam grooves 15d (only one of them is shown in FIG. 19).

Figure 7:
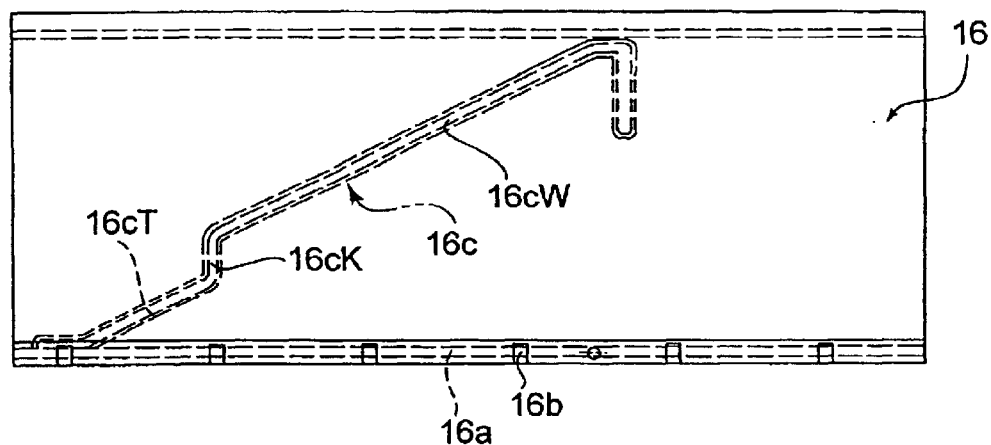
FIG. 7 is a developed view of an inner peripheral surface of a switching ring of the zoom lens barrel shown in FIG. 2.
Figure 8:
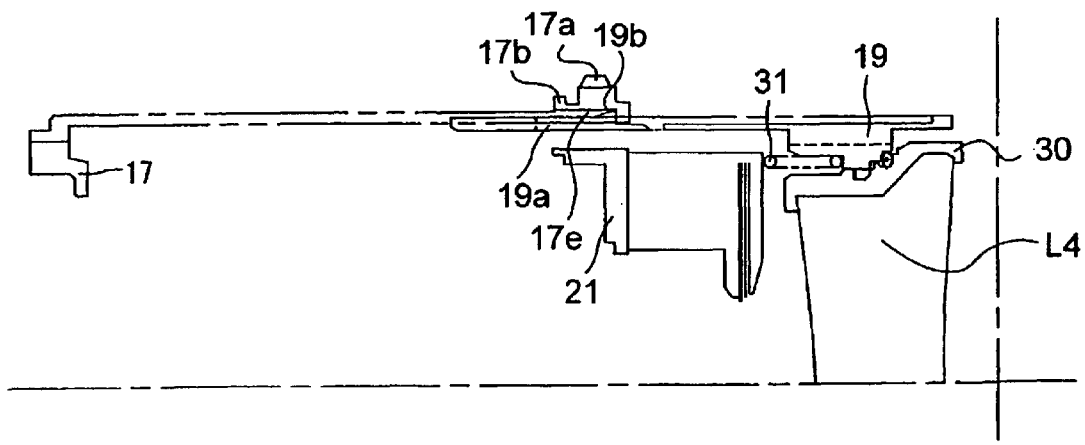
FIG. 8 is a longitudinal cross sectional view of a portion of the zoom lens barrel shown in FIG. 2, showing a structure of engagement of a first lens group support ring with a fourth lens frame, showing only an upper half of the portion of the zoom lens barrel from the optical axis.

The zoom lens barrel 10 is provided inside the cam ring 15 with three concentric rings: the switching ring 16, a first lens group support ring 17 and a first linear guide ring 18, which fit inside each other in that order in a radially inward direction. The first lens group support ring 17 supports the first lens group L1. FIG. 7 is a developed view of the switching ring 16. The switching ring 16 and the first lens group support ring 17 move together along the optical axis O while the switching ring 16 is allowed to rotate freely about the optical axis O relative to the first lens group support ring 17. The first lens group support ring 17 is provided, on an outer peripheral surface thereof in the vicinity of the rear end of the first lens group support ring 17, with a male helicoid 17a, and is further provided immediately in front of the male helicoid 17a with a guide projection 17b. The guide projection 17b is engaged in a circumferential groove 16a (see FIG. 7) which is formed on an inner peripheral surface of the switching ring 16 in the vicinity of the rear end thereof to allow a relative rotation between the guide projection 17b and the circumferential groove 16a about the optical axis O.

The male helicoid 17a of the first lens group support ring 17 is engaged with the female helicoid 15c of the cam ring 15. The cam ring 15 is provided on an inner peripheral surface thereof with a set of six rotation transfer grooves 15e (only three of them appear in FIG. 2) which extend parallel to the optical axis O, while the switching ring 16 is provided, on an outer peripheral surface thereof in the vicinity of the rear end of the switching ring 16, with a set of six rotation transfer projections 16b (only three of them appear in FIG. 2) which project radially outwards to be engaged in the set of six rotation transfer grooves 15e, respectively.

On the other hand, the second linear guide ring 13 is provided on an inner peripheral surface thereof with a plurality of linear guide grooves 13e (only one of them appears in FIG. 2) which extend parallel to the optical axis O, while the first linear guide ring 18 is provided, on an outer peripheral surface thereof in the vicinity of the rear end of the first linear guide ring 18, with a plurality of guide projections 18a (only two of them appear in FIG. 9) which project radially outwards to be engaged in the plurality of linear guide grooves 13e, respectively. The first linear guide ring 18 is provided on an outer peripheral surface thereof with a linear guide groove 18b (see FIG. 9) which extend parallel to the optical axis O, while the first lens group support ring 17 is provided, on an inner peripheral surface thereof in the vicinity of the rear end of the first lens group support ring 17, with a linear guide projection 17c which projects radially inwards to be engaged in the linear guide groove 18*b* (see FIG. 9). Therefore, each of the second linear guide ring 13, the first linear guide ring 18 and the first lens group support ring 17 is movable along the optical axis O without relatively rotating about the optical axis O. The first linear guide ring 18 is provided in the immediate vicinity of the rear end thereof with an outer flange 18*f* (see FIG. 9) which projects radially outwards to be engaged in a circumferential groove 15*f* (see FIG. 6) which is formed on an inner peripheral surface of the cam ring 15 in the immediate vicinity of the rear end thereof so that a relative rotation between the outer flange 18*f* and the circumferential groove 15*f* about the optical axis O is possible, and so that the outer flange 18*f* and the circumferential groove 15*f* move together in the optical axis direction.

Therefore, if a rotation of the cam ring 15 is transferred to the switching ring 16 via the engagement of the set of six rotation transfer projections 16*b* with the set of six rotation transfer grooves 15*e*, the first lens group support ring 17, which has the male helicoid 17*a* engaged with the male helicoid 15*c* of the cam ring 15 and is prevented from rotating by the first linear guide ring 18, moves along the optical axis O.

The zoom lens barrel 10 is provided in the rear of the first lens group support ring 17 with a fourth lens group support ring 19. The fourth lens group support ring 19 is supported by the first lens group support ring 17 to be freely movable linearly along the optical axis O without rotating about the optical axis O relative to the first lens group support ring 17. The fourth lens group support ring 19 supports the fourth lens group L4, and is provided on an outer peripheral surface thereof with a set of three axial arms 19*a* which extend parallel to the optical axis O. The first lens group support ring 17 is provided with a set of three linear guide slots 17*d* which extend parallel to the optical axis O. The fourth lens group support ring 19 and the first lens group support ring 17 are engaged with each other with the set of three axial arms 19*a* being slidably engaged in the set of three linear guide slots 17*d*, respectively.

Figure 9:
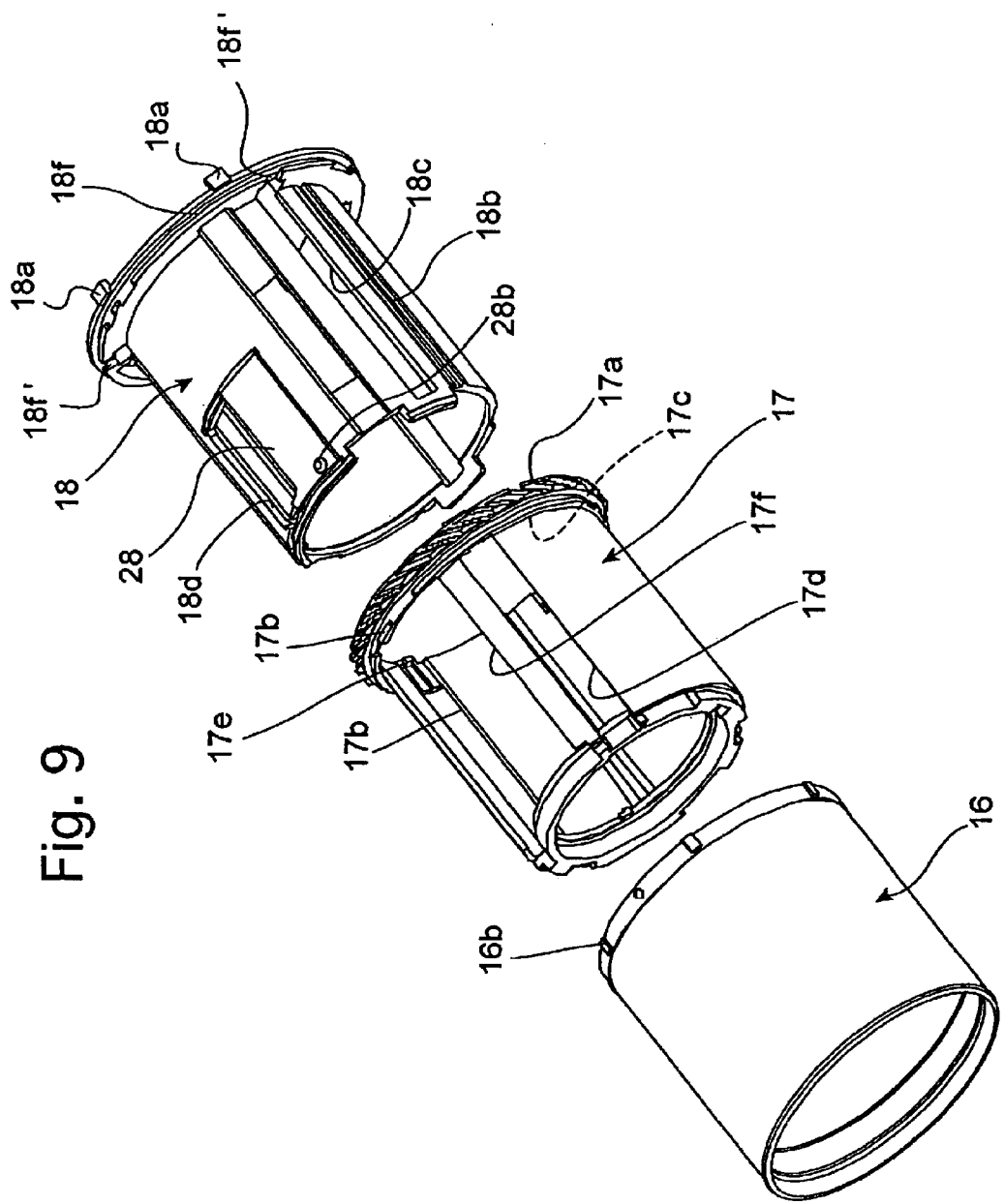
FIG. 9 is a developed perspective view of the switching ring, the first lens group support ring and a first linear guide ring of the zoom lens shown in FIG. 2.
Figure 10:
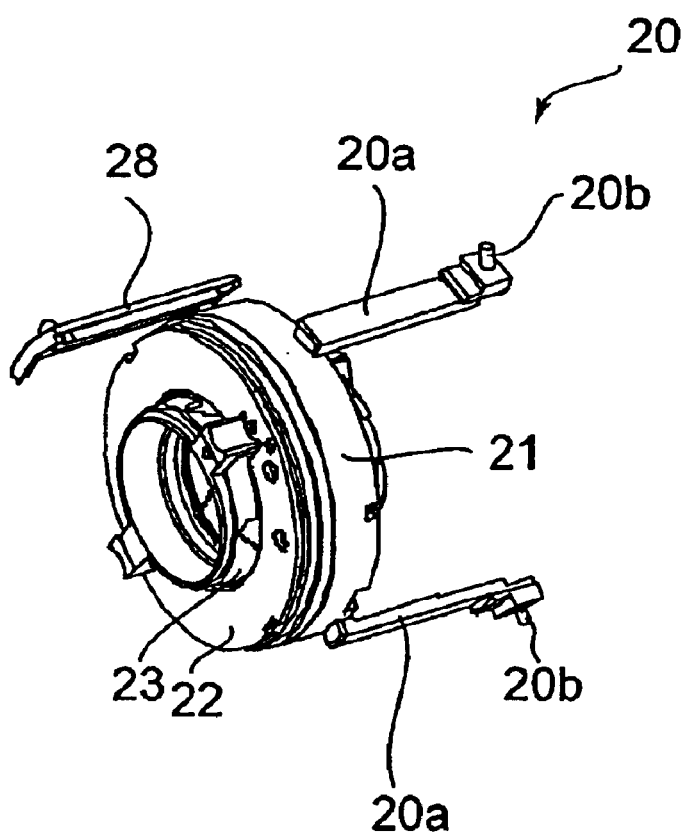
FIG. 10 is a perspective view of a second/third lens group support unit of the zoom lens barrel shown in FIG. 2.
Figure 11:
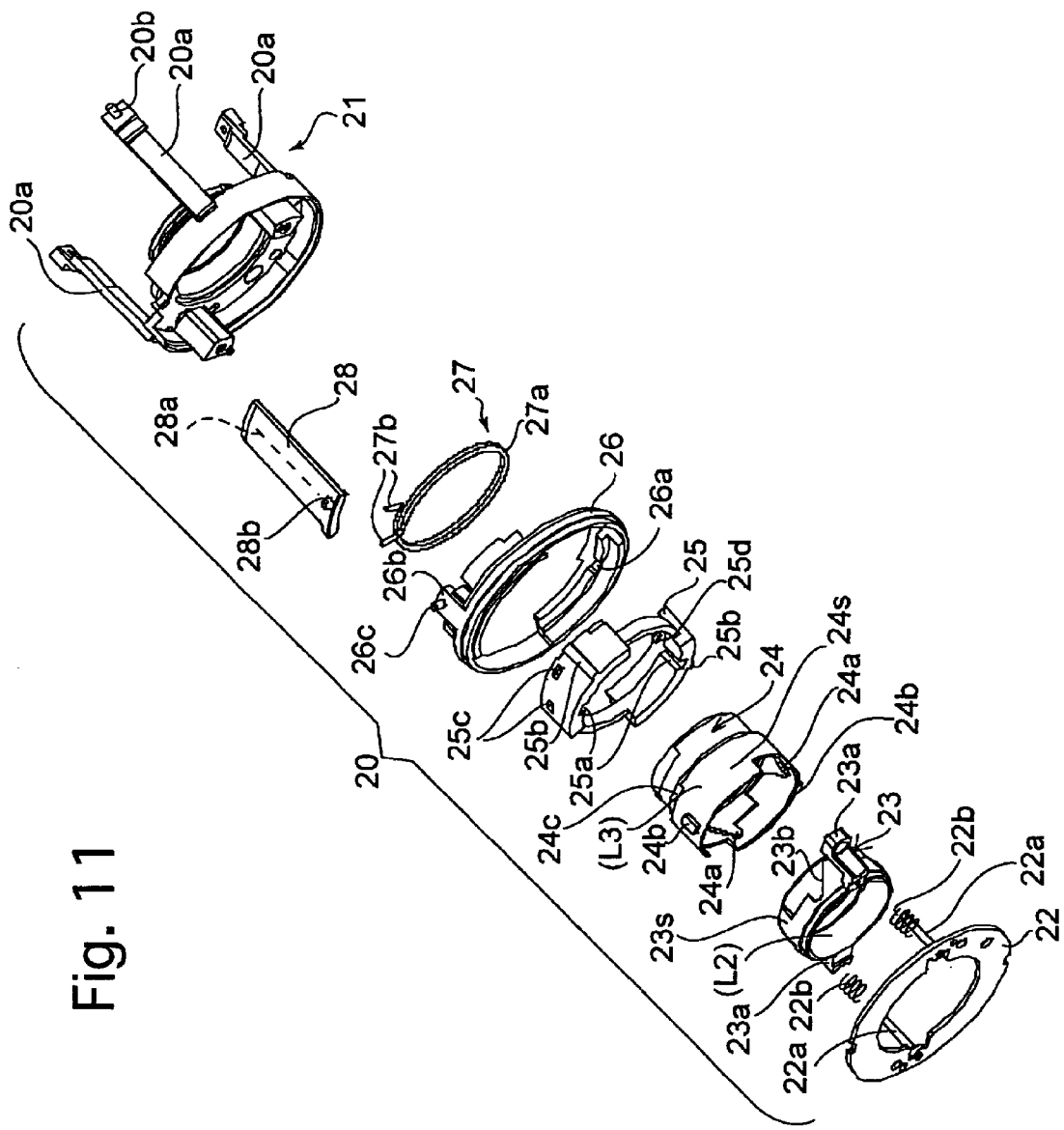
FIG. 11 is an exploded perspective view of the second/third lens group support unit shown in FIG. 10.
Figure 12:
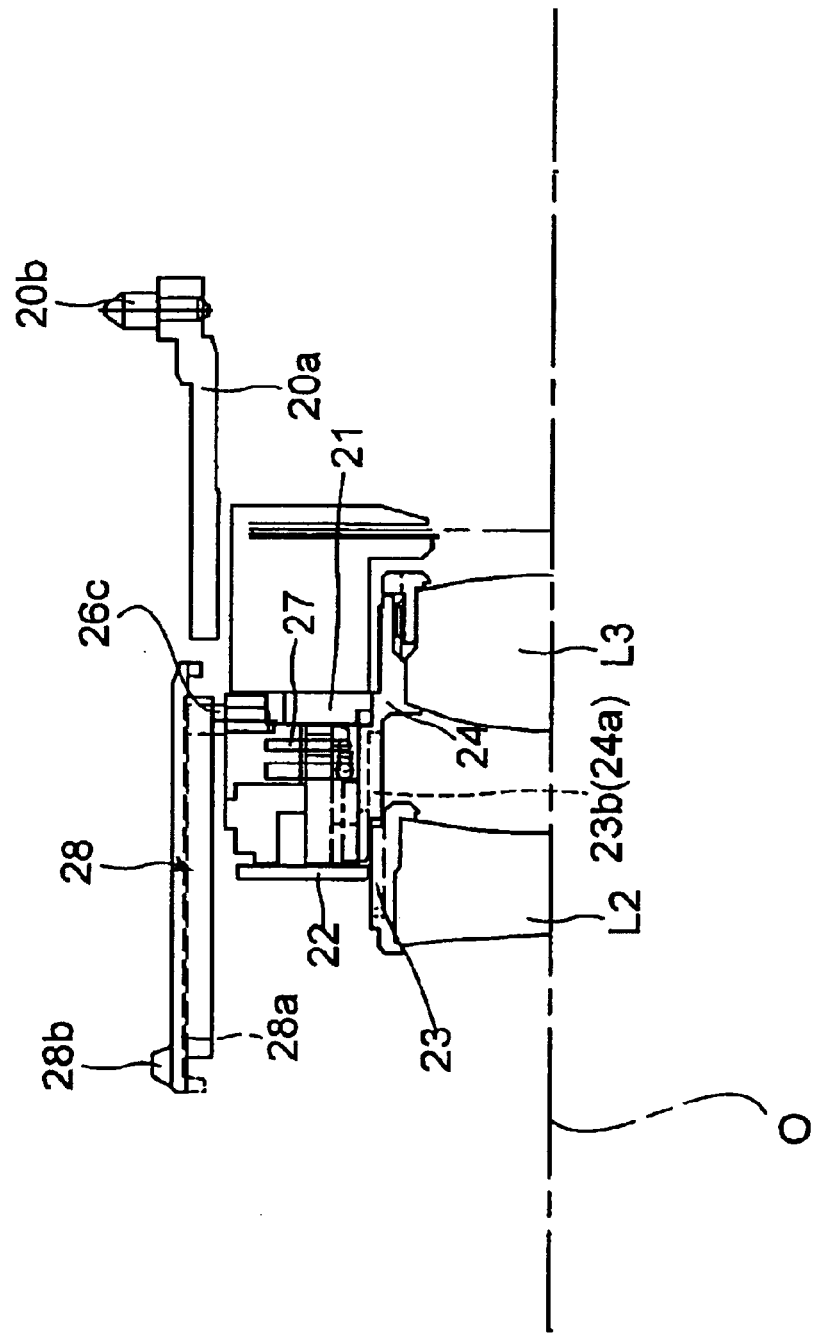
FIG. 12 is a longitudinal cross sectional view of a switching mechanism of the zoom lens barrel shown in FIG. 2 that includes the second/third lens group support unit shown in FIG. 10, showing only an upper half of the switching mechanism from the optical axis.
Figure 13:
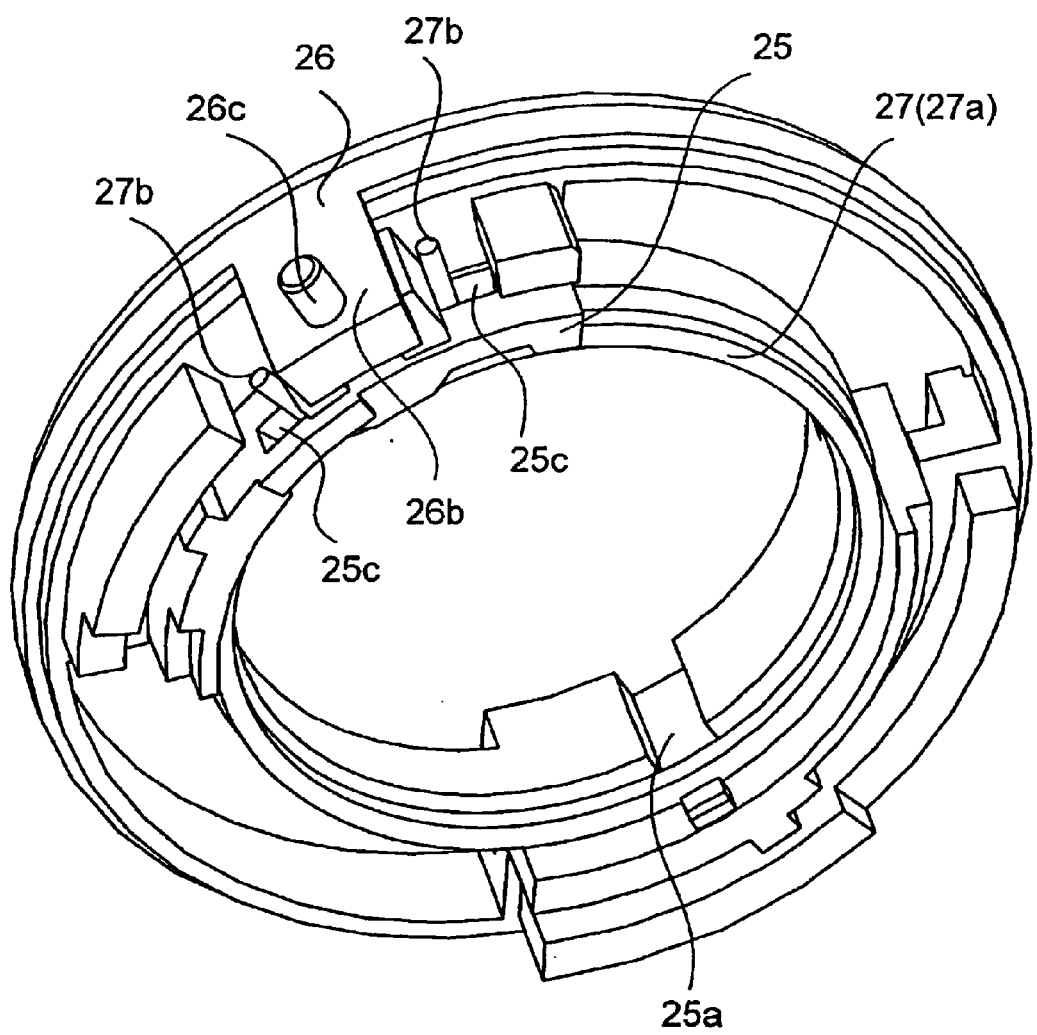
FIG. 13 is a perspective view of an overtravel mechanism incorporated in the second/third lens group support unit shown in FIGS. 10 and 11.

The zoom lens barrel 10 is provided in association with the first linear guide ring 18 with a second/third lens group support unit (ring member) 20 (see FIGS. 10 and 11) which supports the second lens group L2 and the third lens group L3. The second/third lens group support unit 20 is provided on a second/third lens group moving ring 21 thereof with a set of three guide arms 20*a* which extend parallel to the optical axis O. The first linear guide ring 18 is provided with a set of three linear guide slots 18*c* in which the set of three guide arms 20*a* are slidably engaged. A set of three cam followers 20*b* are fixed to the set of three guide arms 20*a* in the vicinity of the rear ends thereof, respectively. Each cam follower 20*b* projects radially outwards to be engaged in the associated one of the three bottomed cam grooves 15*d* of the cam ring 15. FIG. 10 shows the second/third lens group support unit 20 in an assembled state, while FIG. 11 shows the second/third lens group support unit 20 in a disassembled state. As shown in FIGS. 6 and 19, each of the three bottomed cam grooves 15*d* consists of a photographing section 15*d*1 (which includes the wide-angle mode section, the mode switching section and the telephoto mode section which are shown in FIG. 19) for moving the second/third lens group support unit 20 to a ready-to-photograph position among a plurality of ready-to-photograph positions, an accommodation section 15*d*2 for positioning the second/third lens group support unit 20 to an accommodation position thereof (in which no photographing operation is performed), and a transfer section 15*d*3, which is positioned between the photographing section 15*d*1 and the accommodation section 15*d*2, for moving the second/third lens group support unit 20 between the photographing section 15*d*1 and the accommodation section 15*d*2. The entire portion of the photographing section 15*d*1 and the entire portion of the transfer section 15*d*3 except for an end portion (rear end portion) of the transfer section 15*d*3 in the vicinity of the accommodation section 15*d*2 are formed as narrow-width cam portions in which the associated cam follower 20*b* is engaged with a minimum clearance. The accommodation section 15*d*2 and the aforementioned rear end portion of the transfer section 15*d*3 are formed as open cam portions which are open at a rear end surface of the cam ring 15. Accordingly, a rotation of the cam ring 15 causes the second/third lens group support unit 20 to move linearly along the optical axis O in accordance with the contours of the set of three cam grooves 15*d*. The outer flange 18*f* of the first linear guide ring 18, which is engaged in the circumferential groove 15*f* of the cam ring 15 so that a relative rotation between the outer flange 18*f* and the circumferential groove 15*f* about the optical axis O is possible, is provided with a set of three cut-out portions 18*f'*. The set of three cut-out portions 18*f'* are positioned behind the accommodation sections 15*d*2 of the set of three cam grooves 15 to allow the set of three cam followers 20*b* to enter the set of three cut-out portions 18*f'* (see FIGS. 3, 9 and 18A; only two of them appear in FIG. 9), respectively, so that each cam follower 20*b* can move rearward beyond the front end surface of the outer flange 18*f* when the second/third lens group support unit 20 retracts to its retracted position (accommodation position).

The zoom lens barrel 10 is provided between the second/third lens group support unit 20 and the fourth lens group support ring 19 with a compression coil spring (biasing device) 31 for biasing the fourth lens group support ring 19 rearward. Each of the set of three axial arms 19*a* is provided with a claw portion 19*b* (see FIG. 8) which is engaged with an associated inward projection 17*e* (see FIGS. 8 and 9) which is formed on the first lens group support ring 17 at the rear end thereof to determine the rear limit for the axial movement of the fourth lens group support ring 19 with respect to the first lens group support ring 17 against the spring force of the compression coil spring 31 to prevent the fourth lens group support ring 19 from coming out of the first lens group support ring 17. The fourth lens group support ring 19 remains at its rearmost position with respect to the first lens group support ring 17 in a ready-to-photograph state of the zoom lens barrel 10.

Operations of the above described portions of the zoom lens barrel 10 will be hereinafter discussed before the structure of the second/third lens group support unit 20 is discussed in detail. Rotating the helicoid ring 12 by rotation of the drive pinion 14 causes the helicoid ring 12 to move along the optical axis O while rotating about the optical axis O, thus causing the second linear guide ring 13, which is prevented from rotating, to move along the optical axis O together with the helicoid ring 12. This rotation of the helicoid ring 12 is transferred to the cam ring 15 to move the cam ring 15 along the optical axis O together with the first linear guide ring 18, which is linearly guided, while rotating about the optical axis O. At the same time, this rotation of the cam ring 15 causes the switching ring 16 to move together with the first lens group support ring 17, which is linearly guided, along the optical axis while rotating about the optical axis O with respect to the first lens group support ring 17. When the first lens group support ring 17 moves forward from its retracted position shown in FIG. 4, the compression coil spring 31 resiliently expands gradually to position the fourth lens group support ring 19 at its rearmost position with respect to the first lens group support ring 17. This rearmost position corresponds to wide-angle extremity in the zooming range. Thereafter the first lens group support ring 17 and the fourth lens group support ring 19 move together. Since the first lens group support ring 17 and the fourth lens group support ring 19 hold the first lens group L1 and the fourth lens group L4, respectively, the first lens group L1 and the fourth lens group L4 move together along the optical axis O to be linearly proportional to the angle of rotation of the helicoid ring 12 (without varying the distance between the first lens group L1 and the fourth lens group L4) as shown in FIG. 1.

Figure 3:
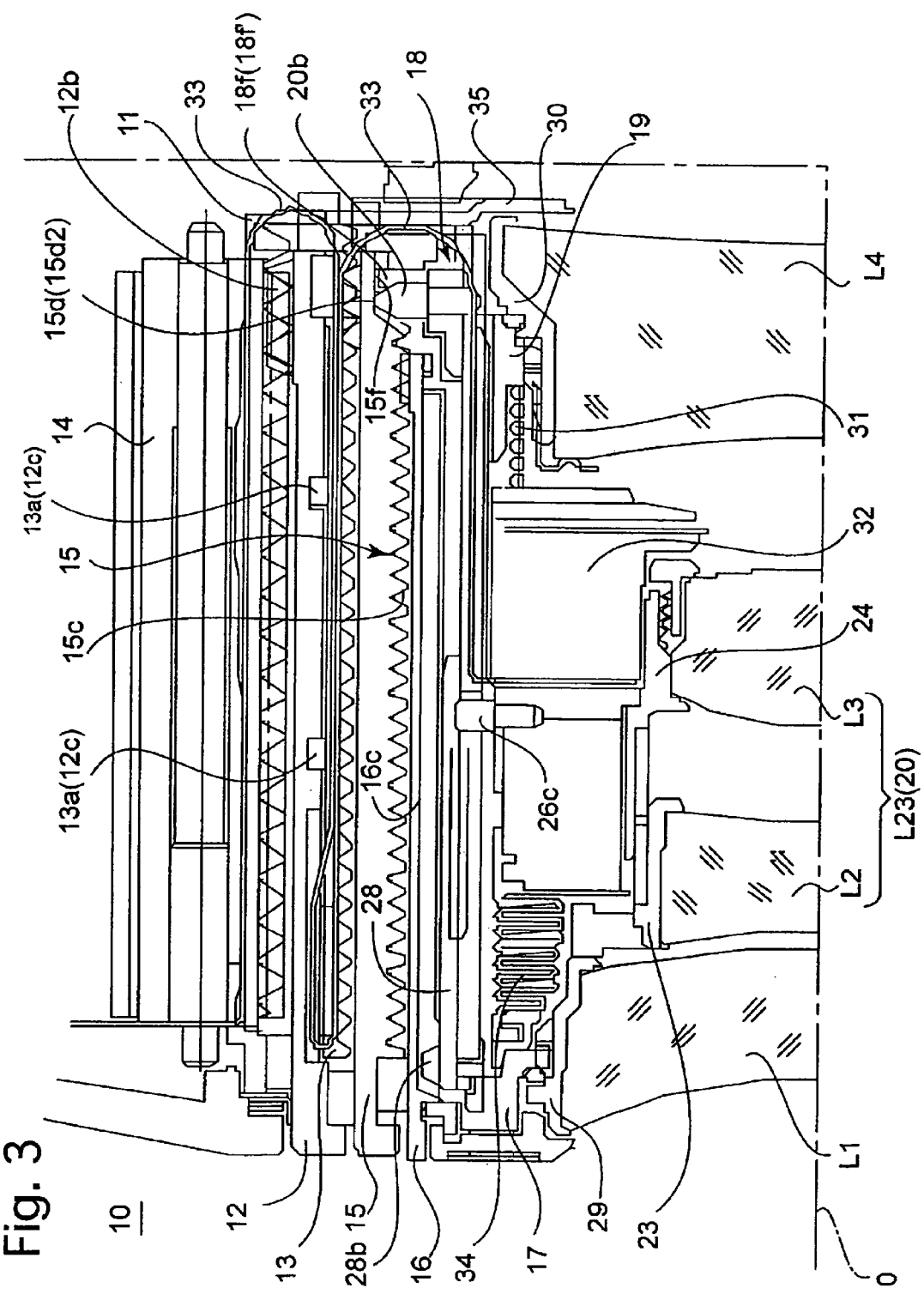
FIG. 3 is a longitudinal cross sectional view of the zoom lens barrel shown in FIG. 2 in the retracted state, showing only an upper half of the zoom lens barrel from an optical axis.
Figure 4:
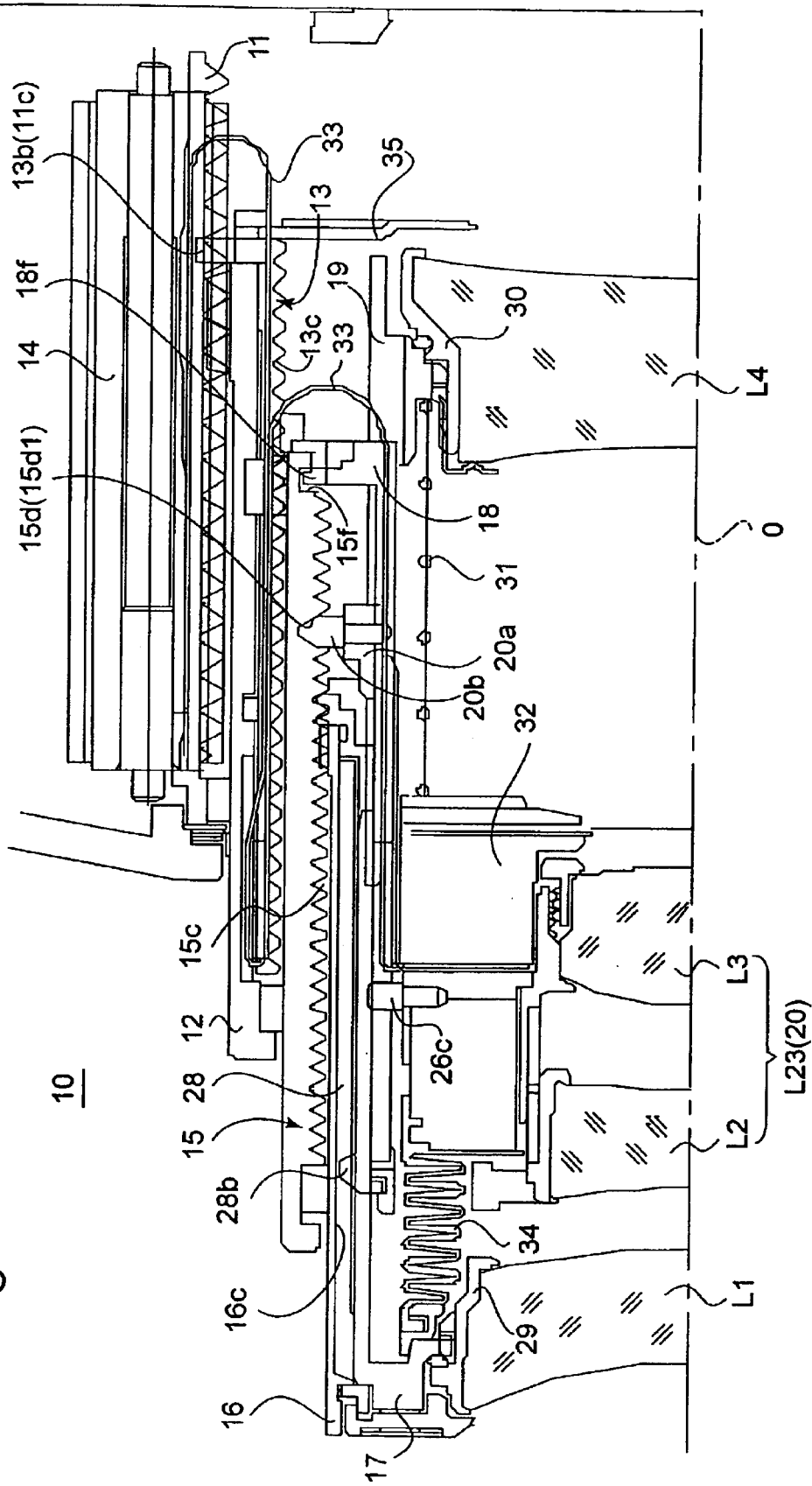
FIG. 4 is a longitudinal cross sectional view of the zoom lens barrel shown in FIG. 2 at the wide-angle extremity which is focused on an image at infinity, showing only an upper half of the zoom lens barrel from the optical axis.
Figure 5:
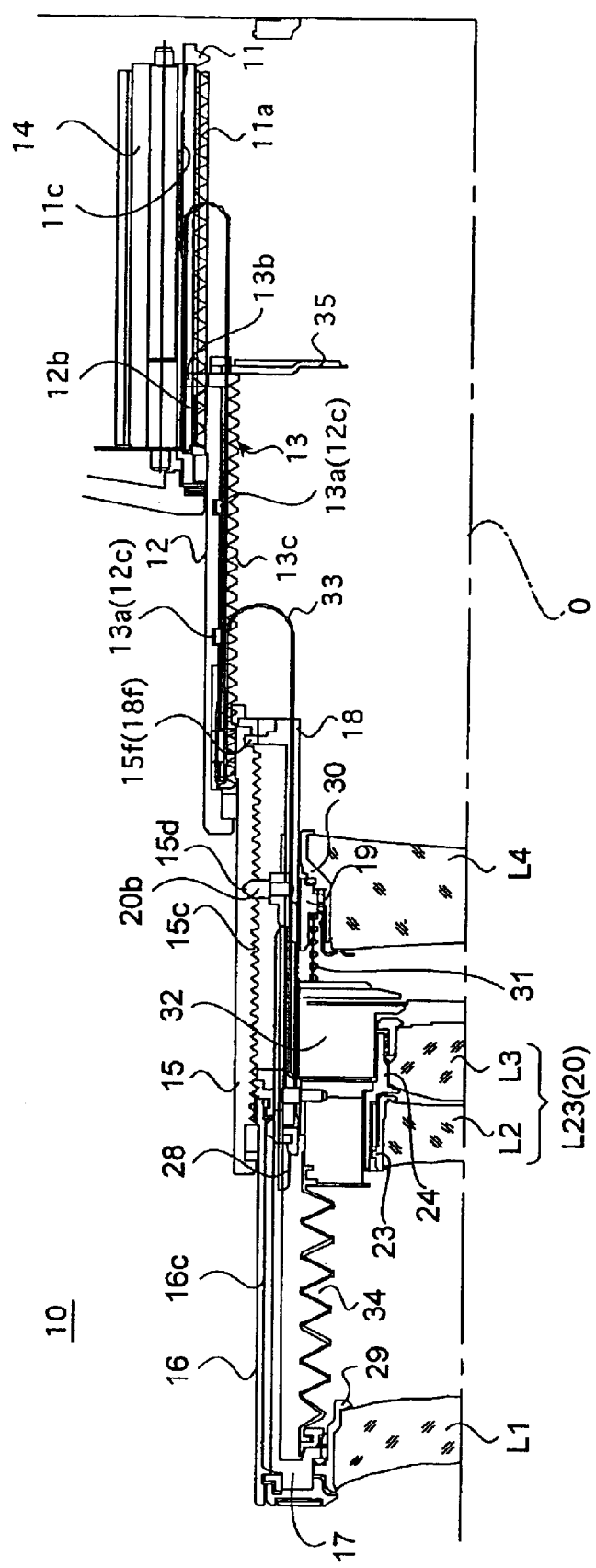
FIG. 5 is a longitudinal cross sectional view of the zoom lens barrel shown in FIG. 2 at telephoto extremity which is focused on an image at infinity, showing only an upper half of the zoom lens barrel from the optical axis.

As can be clearly seen in FIG. 3, a front end surface of the second/third lens group support unit 20 is positioned very closely to or comes in contact with a rear end surface of a first lens frame 29 (by which the first lens group L1 is fixed to be supported) when the zoom lens barrel 10 is in the retracted position. The first lens frame 29 is fixed to a front end portion of the first lens group support ring 17. In the retracted state shown in FIG. 3, since the rear of the accommodation section 15d2 of each cam groove 15d is open, each cam follower 20b is disengaged from a front cam surface (front cam edge) in the associated cam groove 15d to become capable of moving rearward to thereby reduce the length of the zoom lens barrel 10 in the retracted state when the second/third lens group support unit 20 is pressed rearward by the first lens frame 29 against the spring force of the compression coil spring 31. At the same time, a fourth lens frame 30, to which the fourth lens group L4 is fixed to be supported thereby, is moved rearward to the position where the fourth lens frame 30 contacts with a light shield plate 35 (see FIG. 3) by the spring force of the compression coil spring 31. The fourth lens frame 30 is fixed to the fourth lens group support ring 19, while the light shield plate 35 is fixed to a rear end surface of the helicoid ring 12.

On the other hand, the axial position of the second/third lens group support unit 20 is determined by the set of three bottomed cam grooves 15d, which are formed on an inner peripheral surface of the cam ring 15. The second/third lens group support unit 20 supports the second lens group L2 and the third lens group L3, while a continuous rotation of the cam ring 15 together with the switching ring 16 provides the second lens group L2 and the third lens group L3 respective moving paths thereof shown in FIG. 1. The structure of the second/third lens group support unit 20, and associated structures of the cam ring 15 and the switching ring 16 will be hereinafter discussed in detail with reference to FIGS. 9 through 18D.

The set of three guide arms 20a are formed on the second/third lens group moving ring 21 of the second/third lens group support unit 20, while the set of three cam followers 20b are fixed to the set of three guide arms 20a, respectively. The second/third lens group support unit 20 is provided at a front end thereof with a front-end pressing ring plate 22, and is provided between the second/third lens group moving ring 21 and the front-end pressing ring plate 22 with the second lens frame 23, a third lens frame 24, a differential linking ring 25, a differential ring 26 and a differential spring 27 which are accommodated in the space between the second/third lens group moving ring 21 and the front-end pressing ring plate 22, in that order from the object side. The third lens group L3 is fixed to the third lens frame 24 to be supported thereby. A pair of guide pins 22a are fixed to the front-end pressing ring plate 22 to extend rearward to be parallel to the optical axis O. The second lens frame 23 is provided with a pair of guide bosses 23a which are slidably fitted on the pair of guide pins 22a, respectively. A pair of compression coil springs 22b are loosely fitted on the pair of guide pins 22a to press the second lens frame 23 rearward.

Each of the third lens frame 24, the differential linking ring 25 and the differential ring 26 is rotatable about the optical axis O. The second lens frame 23 and the third lens frame 24 are provided with a cylindrical portion 23s and a cylindrical portion 24s, respectively, so that the cylindrical portion 24s of the third lens frame 24 is fitted on the cylindrical portion 23s of the second lens frame 23. The second lens frame 23 is provided on an outer peripheral surface of the cylindrical portion 23s with a set of four inclined cam edges 23b (only one of them appears in FIG. 11) while the third lens frame 24 is provided on an inner peripheral surface of the cylindrical portion 24s with a set of four cam followers 24a (only two of them appears in FIG. 11) which are engaged with the set of four inclined cam edges 23b, respectively. Each cam edge 23b extends linearly, and is inclined with respect to both a circumferential direction of the second lens frame 23 and the optical axis direction. The third lens frame 24 is provided on an outer peripheral surface thereof with a pair of rotation transfer projections 24b while the differential linking ring 25 is provided on an inner peripheral surface thereof with a pair of rotation transfer grooves 25a in which the pair of rotation transfer projections 24b are engaged, respectively, so that the third lens frame 24 and the differential linking ring 25 rotate together at all times. The third lens frame 24 is always pressed rearward by the spring force of the pair of compression coil springs 22b to be in pressing contact with the second/third lens group moving ring 21 to determine the position of the third lens frame 24 in the optical axis direction with respect to the second/third lens group moving ring 21. The differential ring 26 is provided on an inner peripheral surface thereof with a pair of forced-rotation transfer grooves 26a (only one of them appears in FIG. 11) while the differential linking ring 25 is provided on an outer peripheral surface thereof with a pair of forced-rotation transfer projections 25b which are engaged in the pair of forced-rotation transfer grooves 26a, respectively, with a predetermined circumferential clearance between each forced-rotation transfer projection 25b and the associated forced-rotation transfer groove 26a (see FIGS. 16 and 17).

The differential spring 27 is a torsion spring 27 consisting of a loop portion (coil portion) 27a with its center substantially on the optical axis O and a pair of engaging radial projections 27b which project radially outwards from the opposite ends of the loop portion 27a, respectively. The loop portion 27a is fitted in the differential linking ring 25 to be engaged with an inner peripheral surface thereof by friction. The differential linking ring 25 is provided with a pair of radial through holes 25c into which the pair of engaging radial projections 27b are inserted from the inside of the differential linking ring 25 to project radially outwards from an outer peripheral surface of the differential linking ring 25. The differential linking ring 25 is provided on an inner peripheral surface thereof with an inward projection 25d (see FIG. 11) which is engaged with the loop portion 27a of the differential spring 27 to prevent the differential spring 27 from coming off the differential linking ring 25. The differential ring 26 is provided with a rotation transfer projection 26b which projects rearwards, and the pair of engaging radial projections 27b of the differential spring 27 are in pressing in contact with opposite surfaces of the rotation transfer projection 26b in a circumferential direction of the differential ring 26 in opposite directions towards each other. The differential linking ring 25 normally rotates together with the differential ring 26 via the differential spring 27 when the differential ring 26 rotates. However, if the differential linking ring 25 reaches one end of the range of rotation thereof (i.e., if a resistance which is generated in the differential linking ring 25 to rotate is greater than a predetermined resistance) when the differential ring 26 rotates, the differential ring 26 rotates relative to the differential linking ring 25 while the differential spring 27 is deformed to open the pair of engaging radial projections 27b (i.e., to move the pair of engaging radial projections 27b in opposite directions away from each other in a circumferential direction of the differential spring 27).

The second/third lens group support unit 20 is provided with a switching leaf (switching member) 28 which is provided on an inner peripheral surface thereof with a rotation transfer groove (straight groove) 28a which extends parallel to the optical axis O, while the rotation transfer projection 26b is provided with a linking pin 26c which projects radially outwards to be engaged in the rotation transfer groove 28a. As shown in FIG. 9, the switching leaf 28 is positioned in a guide slot 18d (see FIG. 9) formed on the first linear guide ring 18, and is supported by the first linear guide ring 18 to be movable in a circumferential direction of the first linear guide ring 18 with respect to the first linear guide ring 18 within a predetermined angle of rotation about the optical axis O. The switching ring 16 is provided on an inner peripheral surface thereof with a switching groove 16c, while the switching leaf 28 is provided, on an outer peripheral surface thereof in the vicinity of the front end of the switching leaf 28, with a follower projection 28b which is engaged in the switching groove 16c. The differential linking ring 25, the differential ring 26 and the switching leaf 28 constitute a drive system for driving the 24 to rotate forward and reverse. Furthermore, the switching ring 16, the switching groove 16c, and the follower projection 28b of the switching leaf 28 constitute a switching leaf moving mechanism (switching member moving mechanism).

Figure 18C:
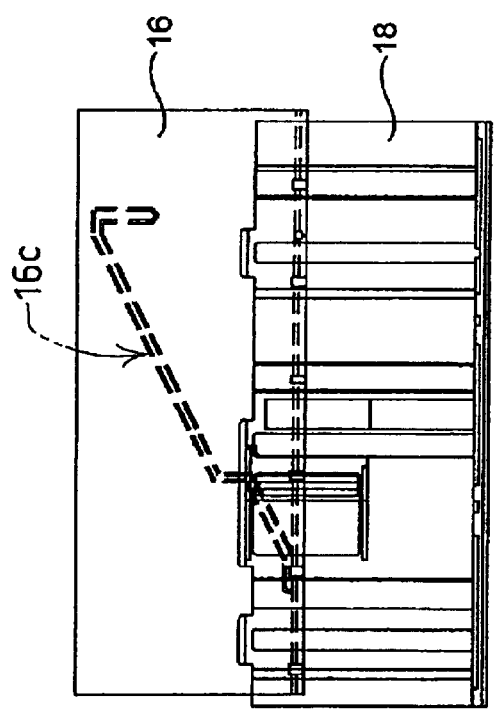
Figure 18D:
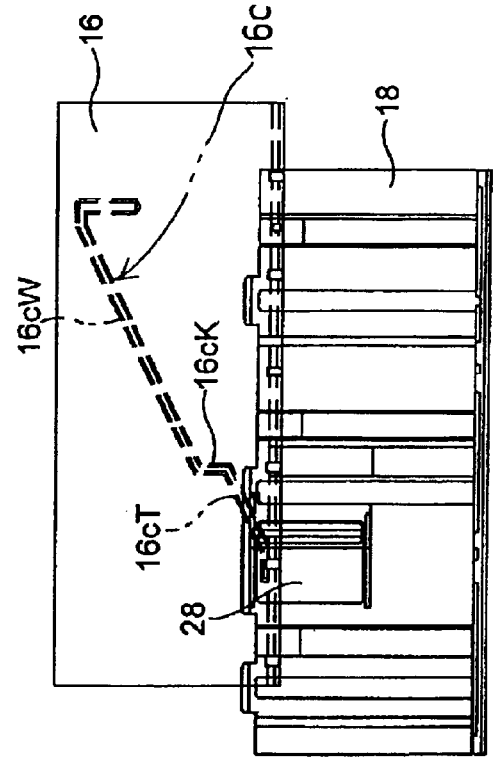

As shown in FIGS. 7 and 18A, the switching groove 16c consists of a telephoto section 16cT, a switching section 16cK and a wide-angle section 16cW, in that order from rear to front of the switching groove 16c (i.e., from bottom to top as viewed in FIG. 7). Each of the telephoto section 16cT and the wide-angle section 16cW is inclined with respect to both a circumferential direction of the switching ring 16 and the optical axis direction. The lead angle of each of the telephoto section 16cT and the wide-angle section 16cW is the same as that of the threads of the female helicoid 15c of the cam ring 15, and the direction of inclination of each of the telephoto section 16cT and the wide-angle section 16cW is opposite to that of the threads of the female helicoid 15c of the cam ring 15. The switching section 16cK extends parallel to the optical axis O. Therefore, when the cam ring 15 and the switching ring 16 rotate together, the switching leaf 28 does not rotate relative to the first linear guide ring 18 as long as the follower projection 28b of the switching leaf 28 remains engaged in either the telephoto section 16cT or the wide-angle section 16cW. This keeps the distance between the second lens group L2 and the third lens group L3 at either a wide distance in the wide-angle range or a narrow distance in the telephoto range (see FIG. 1). However, in the case where the follower projection 28b of the switching leaf 28 is engaged in the switching section 16cK, the switching leaf 28 rotates relative to the first linear guide ring 18 when the cam ring 15 and the switching ring 16 rotate together. This rotation of the switching leaf 28 relative to the first linear guide ring 18 varies the distance between the narrow distance and the wide distance.

As shown in FIGS. 14 and 15, the third lens frame 24 is provided with a rotational range limit groove 24c and the second/third lens group moving ring 21 is provided with a stop projection 21a which is engaged in the rotational range limit groove 24c to limit the range of rotation (rotational angle) of the third lens frame 24 relative to the second/third lens group moving ring 21 to a sufficient range for the third lens frame 24 to be switched between the wide-angle position and the telephoto position. The range of rotation (rotational angle) of a combination of the switching leaf 28 and the differential ring 26 is determined to be greater than that of the third lens frame 24, and the difference therebetween is absorbed by the differential spring 27.

Figure 16:
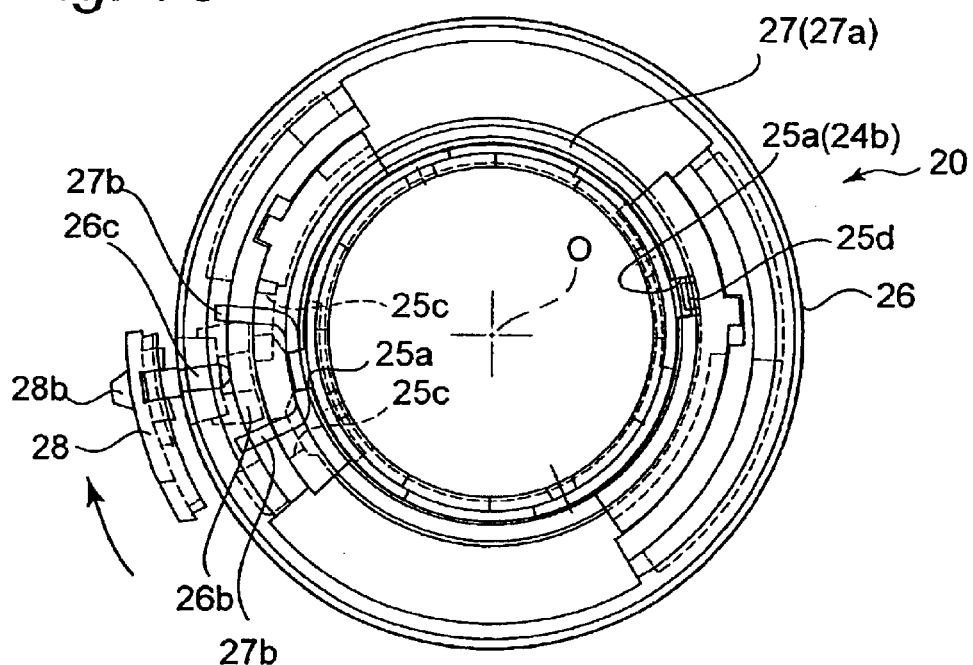
FIG. 16 is a front elevational view of the second/third lens group support unit in a state shown in FIG. 14.
Figure 17:
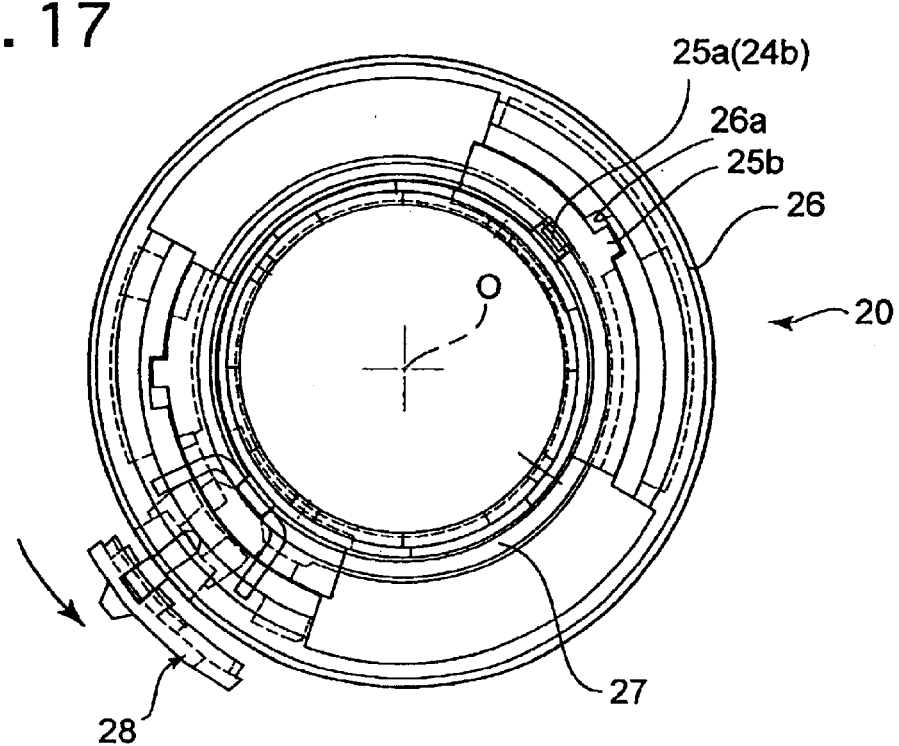
FIG. 17 is a front elevational view of the second/third lens group support unit in a state shown in FIG. 15.

If the switching leaf 28 is rotated counterclockwise from the position shown in FIG. 16 to the position shown in FIG. 17, via the engagement of the follower projection 28b with the switching groove 16c in a state shown in FIG. 14 where the second lens frame 23 (the second lens group L2) and the third lens frame 24 (the third lens group L3) are sufficiently apart from each other in the optical axis direction, the differential ring 26 rotates. This rotation of the differential ring 26 is transferred to the differential linking ring 25 via the engagement of the pair of engaging radial projections 27b of the differential spring 27 with the rotation transfer projection 26b to rotate the third lens frame 24 in the same rotational direction as the differential ring 26. This rotation of the third lens frame 24 causes one end of the rotational range limit groove 24c (the left end as viewed in FIGS. 14 and 15) to come into contact with the stop projection 21a to thereby prevent the differential linking ring 25, which rotates together with the third lens frame 24, from further rotating together with the third lens frame 24. Even after the differential linking ring 25 is prevented from rotating, the differential ring 26 continues to rotate in the same rotational direction. This overtravel of the differential ring 26 is absorbed by a resilient deformation of the differential spring 27. At the same time, the rotation of the third lens frame 24 causes the second lens frame 23, which is biased rearward by the pair of compression coil springs 22b, to move rearward due to the engagement of the set of four cam followers 24a with the set of four inclined cam edges 23b, thus causing the second lens group L2 and the third lens group L3 to approach each other (see FIGS. 15 and 17). The pair of forced-rotation transfer projections 25b are tightly engaged with the pair of forced-rotation transfer grooves 26a, respectively, to forcefully transfer rotation of the differential ring 26 to the differential linking ring 25 in the event of the pair of engaging radial projections 27b of the differential spring 27 being open due to a resistance in the differential linking ring 25 from rotating caused by some reason.

If the switching leaf 28 is rotated reversely, i.e., clockwise from the position shown in FIG. 17 to the position shown in FIG. 16, via the engagement of the follower projection 28b with the switching groove 16c in a state shown in FIG. 15 where the second lens frame 23 (the second lens group L2) and the third lens frame 24 (the third lens group L3) are positioned closely to each other in the optical axis direction, the second lens frame 23 (the second lens group L2) and the third lens frame 24 (the third lens group L3) move apart from each other in the optical axis direction in the reverse fashion to the above described fashion. The operations of the differential ring 25, the differential linking ring 26 and the differential spring 27 are the same as those described above when the switching leaf 28 is rotated counterclockwise as viewed in FIG. 16. Each inclined cam edge 23b of the second lens frame 23 is provided on opposite ends thereof with a front recess 23b1 and a rear recess 23b2 for holding the associated cam follower 24a at a telephoto mode position and a wide-angle mode position with stability, respectively. The four inclined cam edges 23b each having such structure are arranged at equi-angular intervals in a circumferential direction of the second lens frame 23 (i.e., a circumferential direction of the third lens frame 24) to ensure precision in spacing (i.e., the distance) between the second lens group L2 and the third lens group L3 and the precision in positioning the second lens group L2 and the third lens group L3 concentrically with the optical axis O.

The zoom lens barrel 10 is provided immediately behind the second/third lens group moving ring 21 with a shutter unit 32 which is fixed to the second/third lens group moving ring 21 by set screws (see FIG. 2). A flexible printed wiring board (flexible PWB) 33 for electrically connecting the shutter unit 32 to a control circuit of the camera body (not shown) extends from the shutter unit 32. The zoom lens barrel 10 is provided between an inner peripheral surface of the first lens frame 17 in the vicinity of the front end thereof and a front surface of the second/third lens group support unit 20 with a light shield bellows 34.

Operations of the zoom lens barrel 10 to achieve focus will be hereinafter discussed with reference mainly to FIG. 19. In the present embodiment of the zoom lens barrel, the set of three bottomed cam grooves 15d are also used to achieve focus, i.e., a focusing operation is performed with a rotation of the cam ring 15. The step-zoom lens barrel 10 has a variable focal length of six different focal lengths: four different focal lengths (steps 1, 2, 3 and 4) in the wide-angle mode and two different focal lengths (steps 5 and 6) in the telephoto mode. The contours of the set of three bottomed cam grooves 15d are determined so as to move the second/third lens group support unit 20 (the second lens group L2 and the third lens group L3) between a closest photographing position (N) and an infinite photographing position (∞) in the optical axis direction at each of the six different focal lengths. Specifically, each cam groove 15d includes a step-1 position for the infinite photographing position (∞), a step-1 position for the closest photographing position (N), a step-2 position for the closest photographing position (N), a step-2 position for the infinite photographing position (∞), a step-3 position for the infinite photographing position (∞), a step-3 position for the closest photographing position (N), a step-4 position for the closest photographing position (N), a step-4 position for the infinite photographing position (∞), the mode switching section, a step-5 position for the infinite photographing position (∞), a step-5 position for the closest photographing position (N), a step-6 position for the closest photographing position (N), and a step-6 position for the infinite photographing position (∞), in that order in a rotating direction of the cam ring 15. The angle of rotation (the angular position of the cam ring 15) of the cam ring 15 is controlled in accordance with information on a set focal length and an object distance.

As shown in FIG. 19, each cam groove 15d is formed so that adjacent two step positions for the closest photographing position (N) are positioned closely to each other while adjacent two step positions for the infinite photographing position (∞) are positioned closely to each other (with the exception of the adjacent steps 4 (∞) and 5 (∞)). This structure is advantageous to simplify the contour of each cam groove 15d and to shorten the length thereof.

As can be understood from the above descriptions, the first through fourth lens groups L1, L2, L3 and L4 constitute a zoom lens system, and among these four lens groups the second lens group L2 and the third lens group L3 serve as a switching lens group (distance-varying lens group L23) which changes the distance between two sub-lens groups of the switching lens group (i.e., between the second lens group L2 and the third lens group L3) between two different distances: a first distance in a first focal-length range which ranges from the short focal length extremity to an intermediate focal length, and a second distance in a second focal-length range which ranges from the intermediate focal length to the long focal length extremity.

The zoom lens barrel 10 is provided with a lens distance varying mechanism for varying the distance between the second lens group L2 and the third lens group L3 between a narrow distance and a wide distance by forward and reverse movements of the switching leaf 28 in a circumferential direction of the first linear guide ring 18 (clockwise and counterclockwise as viewed in FIGS. 16 and 17) in the guide slot 18d within a predetermined angle of rotation with respect to the first linear guide ring 18. In this lens distance-varying mechanism, the third lens frame 24 and the differential linking ring 25 rotate together at all times. In addition, the zoom lens barrel 10 is provided between the second lens frame 23 and the third lens frame 24 with a relative-moving mechanism, composed of the set of four inclined cam edges 23b and the set of four cam followers 24a, for moving the third lens frame 24 and the differential linking ring 25 relative to each other. The angle of rotation of the set of four cam followers 24a relative to the second lens frame 23 (i.e., the angle of rotation of the third lens frame 24 relative to the second lens frame 23) is determined by the front recess 23b1 and the rear recess 23b2 of each inclined cam edge 23b, and the distance between the second lens group L2 and the third lens group L3 varies between a narrow distance (see FIG. 5) and a wide distance (see FIG. 4) when each cam follower 24a is engaged with the associated front recess 23b1 and the associated rear recess 23b2, respectively.

In contrast to the angle of rotation of the set of four cam followers 24a relative to the second lens frame 23, the range of rotation (rotational angle) of a combination of the switching leaf 28 and the differential ring 26 is determined to be greater than that of the third lens frame 24, and the difference therebetween is absorbed by the differential spring 27. Specifically, a rotation of the differential ring 26 causes the differential linking ring 25 to rotate together with the differential ring 26 via the differential spring 27 because the pair of engaging radial projections 27b of the differential spring 27 are in pressing in contact with opposite surfaces of the rotation transfer projection 26b in a circumferential direction of the differential ring 26 in opposite directions towards each other. However, if the differential linking ring 25 reaches one of the rotation extremities thereof (i.e., if a resistance which is generated in the differential linking ring 25 to rotate is greater than a predetermined resistance) when the differential ring 26 rotates, the differential ring 26 rotates relative to the differential linking ring 25 while the differential spring 27 is deformed to open the pair of engaging radial projections 27b (i.e., to move the pair of engaging radial projections 27b in opposite directions away from each other in a circumferential direction of the differential spring 27). This action occurs regardless of the rotational direction of the differential ring 26.

The distance between the second lens group L2 and the third lens group L3 can be reliably varied between a narrow distance and a wide distance by the aforementioned structure wherein the differential ring 26 rotates by an angle of rotation greater than the maximum angle of rotation of the third lens frame 24 so that the differential spring 27 is deformed to open the pair of engaging radial projections 27b to thereby absorb the difference in angle of rotation between the differential ring 26 and the third lens frame 24.

In the second/third lens group support unit 20, the second lens frame 23 that supports the second lens group L2 is linearly guided along the optical axis O, while the third lens frame 24 that supports the third lens group L3 is prevented from moving along the optical axis O while being allowed to only rotate about the optical axis O. The second lens frame 23 and the third lens frame 24 include the cylindrical portion 23s and the cylindrical portion 24s, respectively, one of which is fitted on the other, and also the set of four inclined cam edges 23b are formed on an outer peripheral surface of the cylindrical portion 23s of the second lens frame 23 while the set of four cam followers 24a that are respectively engaged with the set of four inclined cam edges 23b are formed on inner peripheral surface of the cylindrical portion 24s of the third lens frame 24. Each cam edge 23b is inclined with respect to both a circumferential direction of the second lens frame 23 and the optical axis direction. The second lens frame 23 and the third lens frame 24 are pressed in a direction to make the set of four cam followers 24a and the set of four inclined cam edges 23b contact each other at all times by the spring force of the pair of compression coil springs 22b. As described above, forward and reverse rotations of the third lens frame 24 by respective operations of the differential linking ring 25, the differential ring 26, the differential spring 27 and the switching leaf 28 cause the second lens frame 23, which is always biased rearward by the spring force of the pair of compression coil springs 22b, to move along the optical axis O by engagement of the set of four cam followers 24a with the set of four inclined cam edges 23b to thereby vary the distance between the second lens group L2 and the third lens group L3 between a narrow distance and a wide distance.

With this structure, the set of four inclined cam edges 23b and the set of four cam followers 24a, which serve as a device for moving the second lens frame 23 and the third lens frame 24 toward and away from each other along the optical axis O, are formed on the second lens frame 23 and the third lens frame 24 on themselves in the second/third lens group support unit 20. Therefore, such a moving device, e.g. a cam mechanism, does not have to be provided as an independent device, which reduces the number of elements of the zoom lens barrel 10, thus simplifying the structure of the zoom lens barrel 10.

The distance between the second lens group L2 and the third lens group L3 can be precisely maintained while the concentricity of the second lens group L2 with the third lens group L3 can be ensured in each of the wide-angle range and the telephoto range because the set of four inclined cam edges 23b are arranged at equi-angular intervals in a circumferential direction of the second/third lens group support unit 20 while the set of four cam followers 24a are correspondingly arranged at equi-angular intervals in a circumferential direction of the second/third lens group support unit 20, and further because of the structure wherein the cylindrical portion 24s of the third lens frame 24 is fitted on the cylindrical portion 23s of the second lens frame 23. In addition, the front recess 23b1 and the rear recess 23b2, which are formed on opposite ends of each inclined cam edge 23b, hold the associated cam follower 24a at a telephoto mode position and a wide-angle mode position with stability, respectively, to further improve the precision of the distance between the second lens group L2 and the third lens group L3 and also the precision of the concentricity of the second lens group L2 with the third lens group L3 in each of the wide-angle range and the telephoto range.

In the present embodiment of the zoom lens barrel, since the driving force for moving the second lens group L2 and the third lens group L3 toward and away from each other is derived from the overall zooming operation of the zoom lens barrel 10, it is not necessary to provide the zoom lens barrel 10 with an independent drive source for supplying such a driving force. This simplifies the structure of the zoom lens barrel 10.

Specifically, the second/third lens group support unit 20 is allowed to move only linearly along the optical axis O without rotating due to the engagement of the set of three guide arms 20a with the set of three linear guide slots 18c. In addition, the set of three cam followers 20b of the second/third lens group support unit 20 are engaged in the set of three bottomed cam grooves 15d of the cam ring 15, respectively, so that the second/third lens group support unit 20 moves long the optical axis O by rotation of the cam ring 15. The switching leaf 28 is supported by the first linear guide ring 18 (which moves together with the cam ring 15 along the optical axis O while allowing the cam ring 15 to rotate with respect to the first linear guide ring 18) to be movable in a circumferential direction of the first linear guide ring 18 with respect to the first linear guide ring 18 within a predetermined angle of rotation about the optical axis O. The switching leaf 28 moves forward and reverse in a circumferential direction of the first linear guide ring 18 at an intermediate focal length in association with rotation of the cam ring 15. More specifically, the switching leaf 28 moves forward and reverse in a circumferential direction of the first linear guide ring 18 due to the engagement of the follower projection 28b of the switching leaf 28 with the switching groove 16c of the switching ring 16, which rotates together with the cam ring 15. Forward and reverse movements of the switching leaf 28 cause the second lens group L2 and the third lens group L3, which serve as the distance-varying lens group L23 of the second/third lens group support unit 20, to vary the distance therebetween between a narrow distance and a wide distance.

In a typical telescoping type zoom lens, the driving force for advancing and retracting one or more movable barrel of the zoom lens is continuously and uniformly transferred to an associated mechanism (or an associated member). The cam ring 15 in the above described embodiment of the zoom lens barrel 10 serves as a rotating member which transfers such a continuous rotation thereof (driving force) to an associated mechanism (or an associated member). On the other hand, the third lens frame 24 of the second/third lens group support unit 20 rotates only when the distance between the second lens group L2 and the third lens group L3 varies, i.e., does not rotate at any other time. Accordingly, the third lens frame 24 rotates irregularly (intermittently). According to such structure of the present embodiment of the zoom lens barrel, a driving force for moving the third lens frame 24 can be properly derived from the cam ring 15, which rotates continuously, via the switching ring 16 (specifically, the switching groove 16c thereof) and the switching leaf 28 (specifically, the follower projection 28b thereof). In other words, since the driving force for advancing and retracting the first through third external barrels 12, 15 and 16 can also be used to move the second lens group L2 and the third lens group L3 toward and away from each other, the zoom lens barrel does not need an independent actuator for moving the second lens group L2 and the third lens group L3 toward and away from each other, which simplifies the structure of the zoom lens barrel 10.

Although the mechanism for moving the switching leaf 28 is good enough to move the switching leaf 28 forward and reverse in a circumferential direction of the first linear guide ring 18 at an intermediate focal length in association with a rotation of the cam ring 15, the mechanism for moving the switching leaf 28 can move the switching leaf 28 forward and reverse by forward and reverse rotations of the cam ring 15 with reliability through the adoption of the switching groove 16c, which is formed on an inner peripheral surface of the switching ring 16, and the follower projection 28b, which projects from the switching leaf 28 to be engaged in the switching groove 16c.

As can be understood from the above descriptions, according to the present invention, a simple and reliable mechanism for varying the distance between two lens groups is achieved. It should be noted that the present invention is not limited solely to the above illustrated embodiment of the zoom lens barrel. For instance, the present invention can be applied to any general zoom lens system which includes two lens groups, wherein the distance between the two lens groups varies between a narrow distance and a wide distance at an intermediate focal length. Moreover, according to another aspect of the present invention which does not limit the invention solely to a zoom lens, the present invention can be applied to a general mechanism for varying the distance between two lens groups between two different distances by forward and reverse rotations of a differential ring.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens distance-varying mechanism for varying a distance between a first lens group and a second lens group, said lens distance-varying mechanism comprising:

a first lens frame which holds said first lens group;

a second lens frame which holds said second lens group, said second lens frame being rotatable relative to said first lens frame within a predetermined angle of rotation;

a relative-moving mechanism for moving said first lens frame and said second lens frame to change a relative position therebetween on an optical axis when said second lens frame is positioned at each of forward and reverse rotation extremities of said second lens frame relative to said first lens frame;

a differential linking ring which rotates together with said second lens frame;

a differential ring which is rotated relative to said differential linking ring by a first angle of rotation greater than a second angle of rotation of said second lens frame relative to said first lens frame; and a biasing member, positioned between said differential ring and said differential linking ring, for absorbing a difference between said first angle of rotation and said second angle of rotation.

2. The lens distance-varying mechanism according to claim 1, wherein said biasing member comprises a torsion coil spring.

3. The lens distance-varying mechanism according to claim 2, wherein said torsion coil spring comprises a coil portion and a pair of engaging radial projections which project radially outwards from opposite ends of said coil portion, respectively, wherein said coil portion is engaged with said differential linking ring by friction, and wherein said pair of engaging radial projections project radially outwards from a pair of radial through holes which are formed on said differential linking ring to hold a rotation transfer projection formed on said differential ring.

4. The lens distance-varying mechanism according to claim 3, wherein said coil portion is fitted in said differential linking ring to be engaged with an inner peripheral surface thereof by friction.

5. The lens distance-varying mechanism according to claim 3, wherein said pair of engaging radial projections of said torsion coil spring are in pressing contact with opposite surfaces of said rotation transfer projection in a circumferential direction of said differential ring in opposite directions towards each other.

6. The lens distance-varying mechanism according to claim 1, wherein said relative-moving mechanism comprises:

at least one inclined cam edge formed on a peripheral surface of one of said first lens frame and said second lens frame; and at least one cam follower formed on a peripheral surface of the other of said first lens frame and said second lens frame to be engaged with said inclined cam edge.

7. The lens distance-varying mechanism according to claim 1, wherein said first lens group and said second lens group serve as movable lens groups of a zoom lens system, wherein said relative-moving mechanism varies a distance between said first lens group and said second lens group between a first distance in a wide-angle range which ranges from a short focal length extremity to an intermediate focal length and a second distance in a telephoto range which ranges from said intermediate focal length to a long focal length extremity; and wherein said first lens group and said second lens group move along said optical axis without changing said distance therebetween in a predetermined moving manner to perform a zooming operation in each of said wide-angle range and said telephoto range.

8. The lens distance-varying mechanism according to claim 7, wherein said first lens frame and said second lens frame, together with said differential linking ring, said differential ring and said biasing member, are supported by a support member which is linearly guided along said optical axis without rotating.

9. The lens distance-varying mechanism according to claim 1, wherein said first lens group and said second lens group serve as movable lens groups of a zoom lens system, and wherein said zoom lens system comprises at least four movable lens groups including said first lens group and said second lens group, said first lens group and said second lens group being positioned between a frontmost lens group and a rearmost lens group of said four movable lens groups.

10. A lens distance-varying mechanism for varying a distance between a first lens group and a second lens group, said lens distance-varying mechanism comprising:

a first lens frame which holds said first lens group and includes a first cylindrical portion, said first lens frame being linearly movable along an optical axis;

a second lens frame which holds said second lens group, said second lens frame being allowed to rotate relative to said first lens frame within a predetermined angle of rotation while being prevented from moving along said optical axis relative to said first lens frame, wherein said second lens frame includes a second cylindrical portion, one of said first cylindrical portion and said second cylindrical portion being fitted on the other;

a plurality of inclined cam edges formed on one of said first cylindrical portion and said second cylindrical portion at predetermined intervals in a circumferential direction, each inclined cam edge of said plurality of inclined cam edge being inclined to both said circumferential direction and the optical axis direction;

a plurality of cam followers formed on the other of said first cylindrical portion and said second cylindrical portion to be engaged with said plurality of inclined cam edges, respectively;

a biasing device for biasing said first lens frame in a direction to bring said plurality of cam followers into contact with said plurality of inclined cam edges, respectively, and a drive system for driving said second lens frame to rotate forward and reverse.

11. The lens distance-varying mechanism according to claim 10, wherein a first recess and a second recess are formed on said one of said first cylindrical portion and said second cylindrical portion at opposite ends of each cam edge of said plurality of cam edges to hold an associated cam follower of said plurality of cam followers with stability.

12. The lens distance-varying mechanism according to claim 10, wherein said first lens group and said second lens group serve as movable lens groups of a zoom lens system,
wherein said relative-moving mechanism varies a distance between said first lens group and said second lens group between a first distance in a wide-angle range which ranges from a short focal length extremity to an intermediate focal length and a second distance in a telephoto range which ranges from said intermediate focal length to a long focal length extremity; and
wherein said first lens group and said second lens group move along said optical axis without changing said distance therebetween in a predetermined moving manner to perform a zooming operation in each of said wide-angle range and said telephoto range.

13. The lens distance-varying mechanism according to claim 12, wherein said first lens frame and said second lens frame are supported by a support member which is linearly guided along said optical axis without rotating, and
wherein the position of said support member in said optical axis direction is controlled by a cam ring which is driven to rotate,
said drive system comprising:
a linear guide ring which moves together with said cam ring along said optical axis while allowing said cam ring to rotate with respect to said linear guide ring;
a switching member which is positioned on a peripheral surface of said linear guide ring to be supported thereby to be relatively movable in a circumferential direction with respect to said linear guide ring within a predetermined angle of rotation about said optical axis;
a switching member moving mechanism for moving said switching member forward and reverse in said circumferential direction of said linear guide ring at an intermediate focal length in association with rotation of said cam ring; and
a movement transfer mechanism for transferring forward and reverse movements of said switching member in said circumferential direction of said linear guide ring to said second lens frame to rotate said second lens frame forward and reverse, respectively.

14. The lens distance-varying mechanism according to claim 13, wherein said forward and reverse movements of said switching member cause said first lens frame and said second lens frame to vary a distance therebetween between a narrow distance and a wide distance.

15. The lens distance-varying mechanism according to claim 10, wherein said first lens group and said second lens group serve as movable lens groups of a zoom lens system.

16. A zoom lens having a zoom lens system including two movable lens groups which are moved relative to each other, wherein a distance between said two movable lens groups varies between a first distance in a wide-angle range which ranges from a short focal length extremity to an intermediate focal length and a second distance in a telephoto range which ranges from said intermediate focal length to a long focal length extremity,
said zoom lens comprises:
a lens group support unit which supports said two movable lens groups, said lens group support unit being linearly guided along an optical axis; and
a cam ring driven to rotate for controlling the position of said lens group support unit in said optical axis direction;
a linear guide ring which moves together with said cam ring along said optical axis while allowing said cam ring to rotate with respect to said linear guide ring;
a switching member which is positioned on a peripheral surface of said linear guide ring to be supported thereby to be relatively movable in a circumferential direction with respect to said linear guide ring within a predetermined angle of rotation about said optical axis;
a switching member moving mechanism for moving said switching member forward and reverse in said circumferential direction of said linear guide ring at an intermediate focal length in association with rotation of said cam ring; and
a lens distance varying mechanism for varying said distance between said two movable lens groups between said first distance and said second distance in association with forward and reverse movements of said switching member at forward and reverse moving limits thereof, respectively.

17. The zoom lens according to claim 16, wherein said switching member moving mechanism comprises:
a switching ring which rotates together with said cam ring;
a switching groove formed on an inner peripheral surface of said switching ring; and
a follower projection which projects from said switching member to be engaged in said switching groove.

18. The zoom lens according to claim 16, wherein said lens distance varying mechanism comprises:
a differential ring which rotates together with said switching member;
a rotating lens frame which supports one of said two movable lens groups, and rotates without moving along said optical axis by a rotation of said differential ring; and
a linear-moving lens frame which supports the other of said two movable lens groups, and linearly moves along said optical axis by a rotation of said rotating lens frame.

19. The zoom lens according to claim 18, wherein said switching member comprises a straight groove which is formed on an inner peripheral surface of said switching member to extend parallel to said optical axis, and wherein said differential ring comprises a projection which projects radially outwards to be engaged in said straight groove.

20. The zoom lens according to claim 16, wherein said linear guide ring comprises a guide slot in which said switching member is positioned so that an outer peripheral surface of said switching member is substantially flush with an outer peripheral surface of said linear guide ring.

21. The zoom lens according to claim 16, comprising a shutter unit which is fixed to said lens group support unit.

22. The zoom lens according to claim 16, wherein said first distance is wider than said second distance.

23. The zoom lens according to claim 16, wherein said zoom lens system comprises at least four movable lens groups, said two movable lens groups being positioned between a frontmost lens group and a rearmost lens group of said four movable lens groups.

24. The zoom lens according to claim 16, wherein said zoom lens is of a telescoping type zoom lens having a plurality of telescoping barrels.

* * * * *